United States Patent
Sarkis et al.

(10) Patent No.: US 11,533,134 B2
(45) Date of Patent: Dec. 20, 2022

(54) FEEDBACK COMMUNICATION ON A SIDELINK

(71) Applicant: QUALCOMM Incorporated, San Diego, CA (US)

(72) Inventors: Gabi Sarkis, San Diego, CA (US); Kapil Gulati, Hillsborough, NJ (US); Sudhir Kumar Baghel, Hillsborough, NJ (US); Tien Viet Nguyen, Bridgewater, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 16/989,742

(22) Filed: Aug. 10, 2020

(65) Prior Publication Data

US 2021/0050958 A1 Feb. 18, 2021

Related U.S. Application Data

(60) Provisional application No. 62/887,566, filed on Aug. 15, 2019.

(51) Int. Cl.
*H04L 1/18* (2006.01)
*H04W 28/04* (2009.01)
(Continued)

(52) U.S. Cl.
CPC .......... *H04L 1/1854* (2013.01); *H04L 5/1469* (2013.01); *H04W 28/04* (2013.01);
(Continued)

(58) Field of Classification Search
None
See application file for complete search history.

(56) References Cited

U.S. PATENT DOCUMENTS 11,101,963 B2* 8/2021 Kim ..................... H04W 28/04
2019/0052436 A1* 2/2019 Desai .................... H04L 5/0053
(Continued)

FOREIGN PATENT DOCUMENTS

WO 2019139513 A1 7/2019

OTHER PUBLICATIONS

International Search Report and Written Opinion—PCT/US2020/045723—ISA/EPO—dated Oct. 26, 2020.

*Primary Examiner* — Hong Shao
(74) *Attorney, Agent, or Firm* — Patterson + Sheridan, L.L.P.

(57) ABSTRACT

The present disclosure provides techniques for communicating feedback for data transmissions over a sidelink in a wireless communication system. For example, devices and methods are provided for wireless communication by a first wireless device. In one example, the first wireless device determines that only one of either feedback can be transmitted to a second wireless device or a second communication can be communicated, wherein the feedback is indicative of whether a data transmission is successfully decoded, and based on that prioritizes one of the feedback or the second communication. In another example, the first wireless device determines that only one of either feedback can be received from the second wireless device or a second communication can be communicated, wherein the feedback is indicative of whether the data transmission is successfully decoded by the second wireless device, and based on that prioritizes one of the feedback or the second communication.

28 Claims, 13 Drawing Sheets

(51) Int. Cl.
*H04W 72/12* (2009.01)
*H04L 5/14* (2006.01)
*H04W 92/18* (2009.01)

(52) U.S. Cl.
CPC ... *H04W 72/1242* (2013.01); *H04W 72/1278* (2013.01); *H04W 92/18* (2013.01)

(56) References Cited

U.S. PATENT DOCUMENTS

2020/0260231 A1* 8/2020 Ganesan ............... H04L 1/1893
2021/0153065 A1* 5/2021 Adjakple .......... H04W 28/0263

* cited by examiner

FEEDBACK COMMUNICATION ON A SIDELINK

CROSS-REFERENCE TO RELATED APPLICATION(S)

This application claims benefit of and priority to U.S. Provisional Application No. 62/887,566, filed Aug. 15, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for communicating feedback for data transmissions over a sidelink in a wireless communication system.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

In some examples, two or more entities (e.g., UEs) may communicate with each other using sidelink signals. Real-world applications of such sidelink communications may include public safety, proximity services, UE-to-network relaying, vehicle-to-vehicle (V2V) communications, vehicle-to-everything (V2X) communications, Internet of Everything (IoE) communications, IoT communications, mission-critical mesh, and/or various other suitable applications. Generally, a sidelink signal may refer to a signal communicated from one entity (e.g., UE1) to another entity (e.g., UE2) without relaying that communication through a scheduling entity (e.g., UE or BS), even though the scheduling entity may be utilized for scheduling and/or control purposes. In some cases, a scheduling entity might not even exist (e.g., in some out of coverage scenarios). In some examples, the sidelink signals may be communicated using a licensed spectrum (unlike wireless local area networks, which typically use an unlicensed spectrum).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between wireless devices, such as over a sidelink.

Certain aspects provide a method for wireless communication by a first wireless device. The method generally includes receiving control information over a sidelink control channel from a second wireless device, the control information comprising information for decoding a data transmission on a sidelink data channel. The method further includes determining whether the data transmission is successfully decoded by the first wireless device. The method further includes determining that only one of either feedback can be transmitted to the second wireless device or a second transmission can be received, wherein the feedback is indicative of whether the data transmission is successfully decoded. The method further includes transmitting the feedback to the second wireless device based on the feedback comprising a negative acknowledgment indicating that the data transmission was not successfully decoded.

Certain aspects provide a method for wireless communication by a first wireless device. The method generally includes receiving control information over a sidelink control channel from a second wireless device, the control information comprising information for decoding a data transmission on a sidelink data channel. The method further includes determining whether the data transmission is successfully decoded by the first wireless device. The method further includes determining that only one of either feedback can be transmitted to the second wireless device or a second transmission can be received, wherein the feedback is indicative of whether the data transmission is successfully decoded. The method further includes receiving the second transmission based on the feedback comprising an acknowledgment indicating that the data transmission was successfully decoded.

Certain aspects provide a method for wireless communication by a first wireless device. The method generally includes receiving control information over a sidelink control channel from a second wireless device, the control information comprising information for decoding a data transmission on a sidelink data channel. The method further includes determining whether the data transmission is successfully decoded by the first wireless device. The method further includes determining that only one of either feedback can be transmitted to the second wireless device or a second transmission can be received, wherein the feedback is indicative of whether the data transmission is successfully decoded. The method further includes either transmitting the feedback to the second wireless device or receiving the second transmission based on a comparison of a priority of the data transmission and a priority of the second transmission.

Certain aspects provide a method for wireless communication by a first wireless device. The method generally includes transmitting control information over a sidelink control channel to a second wireless device, the control information comprising information for the second wireless device to decode a data transmission on a sidelink data channel. The method further includes transmitting the data transmission over the sidelink data channel to the second wireless device. The method further includes determining that only one of either feedback can be received from the second wireless device or a second transmission can be transmitted, wherein the feedback is indicative of whether the data transmission is successfully decoded by the second wireless device. The method further includes independently, at the first wireless device, determining to either receive the feedback from the second wireless device or transmit the second transmission.

Certain aspects provide a method for wireless communication by a first wireless device. The method generally includes transmitting control information over a sidelink control channel to a second wireless device, the control information comprising information for the second wireless device to decode a data transmission on a sidelink data channel. The method further includes transmitting the data transmission over the sidelink data channel to the second wireless device. The method further includes determining that only one of either feedback can be received from the second wireless device or a second transmission can be transmitted, wherein the feedback is indicative of whether the data transmission is successfully decoded by the second wireless device. The method further includes receiving the feedback from the second wireless device.

Certain aspects provide a method for wireless communication by a first wireless device. The method generally includes transmitting control information over a sidelink control channel to a second wireless device, the control information comprising information for the second wireless device to decode a data transmission on a sidelink data channel. The method further includes transmitting the data transmission over the sidelink data channel to the second wireless device. The method further includes determining that only one of either feedback can be received from the second wireless device or a second transmission can be transmitted, wherein the feedback is indicative of whether the data transmission is successfully decoded by the second wireless device. The method further includes transmitting the second transmission.

Certain aspects provide a method for wireless communication by a first wireless device. The method generally includes transmitting control information over a sidelink control channel to a second wireless device, the control information comprising information for the second wireless device to decode a data transmission on a sidelink data channel. The method further includes transmitting the data transmission over the sidelink data channel to the second wireless device. The method further includes determining that only one of either feedback can be received from the second wireless device or a second transmission can be transmitted, wherein the feedback is indicative of whether the data transmission is successfully decoded by the second wireless device. The method further includes either receiving the feedback or transmitting the second transmission based on a comparison of a priority of the data transmission and a priority of the second transmission.

Certain aspects provide a first wireless device. The first wireless device includes a memory and a processor coupled to the memory. The memory and the processor are generally configured to receive control information over a sidelink control channel from a second wireless device, the control information comprising information for decoding a data transmission on a sidelink data channel. The memory and the processor are further configured to determine whether the data transmission is successfully decoded by the first wireless device. The memory and the processor are further configured to determine that only one of either feedback can be transmitted to the second wireless device or a second transmission can be received, wherein the feedback is indicative of whether the data transmission is successfully decoded. The memory and the processor are further configured to transmit the feedback to the second wireless device based on the feedback comprising a negative acknowledgment indicating that the data transmission was not successfully decoded.

Certain aspects provide a first wireless device. The first wireless device includes a memory and a processor coupled to the memory. The memory and the processor are generally configured to receive control information over a sidelink control channel from a second wireless device, the control information comprising information for decoding a data transmission on a sidelink data channel. The memory and the processor are further configured to determine whether the data transmission is successfully decoded by the first wireless device. The memory and the processor are further configured to determine that only one of either feedback can be transmitted to the second wireless device or a second transmission can be received, wherein the feedback is indicative of whether the data transmission is successfully decoded. The memory and the processor are further configured to receive the second transmission based on the feedback comprising an acknowledgment indicating that the data transmission was successfully decoded.

Certain aspects provide a first wireless device. The first wireless device includes a memory and a processor coupled to the memory. The memory and the processor are generally configured to receive control information over a sidelink control channel from a second wireless device, the control information comprising information for decoding a data transmission on a sidelink data channel. The memory and the processor are further configured to determine whether the data transmission is successfully decoded by the first wireless device. The memory and the processor are further configured to determine that only one of either feedback can be transmitted to the second wireless device or a second transmission can be received, wherein the feedback is indicative of whether the data transmission is successfully decoded. The memory and the processor are further configured to either transmit the feedback to the second wireless device or receive the second transmission based on a comparison of a priority of the data transmission and a priority of the second transmission.

Certain aspects provide a first wireless device. The first wireless device includes a memory and a processor coupled to the memory. The memory and the processor are generally configured to transmit control information over a sidelink control channel to a second wireless device, the control information comprising information for the second wireless device to decode a data transmission on a sidelink data channel. The memory and the processor are further configured to transmit the data transmission over the sidelink data channel to the second wireless device. The memory and the processor are further configured to determine that only one of either feedback can be received from the second wireless device or a second transmission can be transmitted, wherein the feedback is indicative of whether the data transmission is successfully decoded by the second wireless device. The memory and the processor are further configured to independently, at the first wireless device, determine to either receive the feedback from the second wireless device or transmit the second transmission.

Certain aspects provide a first wireless device. The first wireless device includes a memory and a processor coupled to the memory. The memory and the processor are generally configured to transmit control information over a sidelink control channel to a second wireless device, the control information comprising information for the second wireless device to decode a data transmission on a sidelink data channel. The memory and the processor are further configured to transmit the data transmission over the sidelink data channel to the second wireless device. The memory and the processor are further configured to determine that only one of either feedback can be received from the second wireless device or a second transmission can be transmitted, wherein the feedback is indicative of whether the data transmission is successfully decoded by the second wireless device. The memory and the processor are further configured to receive the feedback from the second wireless device.

Certain aspects provide a first wireless device. The first wireless device includes a memory and a processor coupled to the memory. The memory and the processor are generally configured to transmit control information over a sidelink control channel to a second wireless device, the control information comprising information for the second wireless device to decode a data transmission on a sidelink data channel. The memory and the processor are further configured to transmit the data transmission over the sidelink data channel to the second wireless device. The memory and the processor are further configured to determine that only one of either feedback can be received from the second wireless device or a second transmission can be transmitted, wherein the feedback is indicative of whether the data transmission is successfully decoded by the second wireless device. The memory and the processor are further configured to transmit the second transmission.

Certain aspects provide a first wireless device. The first wireless device includes a memory and a processor coupled to the memory. The memory and the processor are generally configured to transmit control information over a sidelink control channel to a second wireless device, the control information comprising information for the second wireless device to decode a data transmission on a sidelink data channel. The memory and the processor are further configured to transmit the data transmission over the sidelink data channel to the second wireless device. The memory and the processor are further configured to determine that only one of either feedback can be received from the second wireless device or a second transmission can be transmitted, wherein the feedback is indicative of whether the data transmission is successfully decoded by the second wireless device. The memory and the processor are further configured to either receive the feedback or transmit the second transmission based on a comparison of a priority of the data transmission and a priority of the second transmission.

Certain aspects provide a first wireless device. The first wireless device generally includes means for receiving control information over a sidelink control channel from a second wireless device, the control information comprising information for decoding a data transmission on a sidelink data channel. The first wireless device further includes means for determining whether the data transmission is successfully decoded by the first wireless device. The first wireless device further includes means for determining that only one of either feedback can be transmitted to the second wireless device or a second transmission can be received, wherein the feedback is indicative of whether the data transmission is successfully decoded. The first wireless device further includes means for transmitting the feedback to the second wireless device based on the feedback comprising a negative acknowledgment indicating that the data transmission was not successfully decoded.

Certain aspects provide a first wireless device. The first wireless device generally includes means for receiving control information over a sidelink control channel from a second wireless device, the control information comprising information for decoding a data transmission on a sidelink data channel. The first wireless device further includes means for determining whether the data transmission is successfully decoded by the first wireless device. The first wireless device further includes means for determining that only one of either feedback can be transmitted to the second wireless device or a second transmission can be received, wherein the feedback is indicative of whether the data transmission is successfully decoded. The first wireless device further includes means for receiving the second transmission based on the feedback comprising an acknowledgment indicating that the data transmission was successfully decoded.

Certain aspects provide a first wireless device. The first wireless device generally includes means for receiving control information over a sidelink control channel from a second wireless device, the control information comprising information for decoding a data transmission on a sidelink data channel. The first wireless device further includes means for determining whether the data transmission is successfully decoded by the first wireless device. The first wireless device further includes means for determining that only one of either feedback can be transmitted to the second wireless device or a second transmission can be received, wherein the feedback is indicative of whether the data transmission is successfully decoded. The first wireless device further includes means for either transmitting the feedback to the second wireless device or receiving the second transmission based on a comparison of a priority of the data transmission and a priority of the second transmission.

Certain aspects provide a first wireless device. The first wireless device generally includes means for transmitting control information over a sidelink control channel to a second wireless device, the control information comprising information for the second wireless device to decode a data transmission on a sidelink data channel. The first wireless device further includes means for transmitting the data transmission over the sidelink data channel to the second wireless device. The first wireless device further includes means for determining that only one of either feedback can be received from the second wireless device or a second transmission can be transmitted, wherein the feedback is indicative of whether the data transmission is successfully decoded by the second wireless device. The first wireless device further includes means for independently, at the first wireless device, determining to either receive the feedback from the second wireless device or transmit the second transmission.

Certain aspects provide a first wireless device. The first wireless device generally includes means for transmitting control information over a sidelink control channel to a second wireless device, the control information comprising information for the second wireless device to decode a data transmission on a sidelink data channel. The first wireless device further includes means for transmitting the data transmission over the sidelink data channel to the second wireless device. The first wireless device further includes means for determining that only one of either feedback can be received from the second wireless device or a second transmission can be transmitted, wherein the feedback is indicative of whether the data transmission is successfully decoded by the second wireless device. The first wireless device further includes means for receiving the feedback from the second wireless device.

Certain aspects provide a first wireless device. The first wireless device generally includes means for transmitting control information over a sidelink control channel to a second wireless device, the control information comprising information for the second wireless device to decode a data transmission on a sidelink data channel. The first wireless device further includes means for transmitting the data transmission over the sidelink data channel to the second wireless device. The first wireless device further includes means for determining that only one of either feedback can be received from the second wireless device or a second transmission can be transmitted, wherein the feedback is indicative of whether the data transmission is successfully decoded by the second wireless device. The first wireless device further includes means for transmitting the second transmission.

Certain aspects provide a first wireless device. The first wireless device generally includes means for transmitting control information over a sidelink control channel to a second wireless device, the control information comprising information for the second wireless device to decode a data transmission on a sidelink data channel. The first wireless device further includes means for transmitting the data transmission over the sidelink data channel to the second wireless device. The first wireless device further includes means for determining that only one of either feedback can be received from the second wireless device or a second transmission can be transmitted, wherein the feedback is indicative of whether the data transmission is successfully decoded by the second wireless device. The first wireless device further includes means for either receiving the feedback or transmitting the second transmission based on a comparison of a priority of the data transmission and a priority of the second transmission.

Certain aspects provide a non-transitory computer-readable storage medium having instructions stored thereon for performing a method of wireless communication by a first wireless device. The method generally includes receiving control information over a sidelink control channel from a second wireless device, the control information comprising information for decoding a data transmission on a sidelink data channel. The method further includes determining whether the data transmission is successfully decoded by the first wireless device. The method further includes determining that only one of either feedback can be transmitted to the second wireless device or a second transmission can be received, wherein the feedback is indicative of whether the data transmission is successfully decoded. The method further includes transmitting the feedback to the second wireless device based on the feedback comprising a negative acknowledgment indicating that the data transmission was not successfully decoded.

Certain aspects provide a non-transitory computer-readable storage medium having instructions stored thereon for performing a method of wireless communication by a first wireless device. The method generally includes receiving control information over a sidelink control channel from a second wireless device, the control information comprising information for decoding a data transmission on a sidelink data channel. The method further includes determining whether the data transmission is successfully decoded by the first wireless device. The method further includes determining that only one of either feedback can be transmitted to the second wireless device or a second transmission can be received, wherein the feedback is indicative of whether the data transmission is successfully decoded. The method further includes receiving the second transmission based on the feedback comprising an acknowledgment indicating that the data transmission was successfully decoded.

Certain aspects provide a non-transitory computer-readable storage medium having instructions stored thereon for performing a method of wireless communication by a first wireless device. The method generally includes receiving control information over a sidelink control channel from a second wireless device, the control information comprising information for decoding a data transmission on a sidelink data channel. The method further includes determining whether the data transmission is successfully decoded by the first wireless device. The method further includes determining that only one of either feedback can be transmitted to the second wireless device or a second transmission can be received, wherein the feedback is indicative of whether the data transmission is successfully decoded. The method further includes either transmitting the feedback to the second wireless device or receiving the second transmission based on a comparison of a priority of the data transmission and a priority of the second transmission.

Certain aspects provide a non-transitory computer-readable storage medium having instructions stored thereon for performing a method of wireless communication by a first wireless device. The method generally includes transmitting control information over a sidelink control channel to a second wireless device, the control information comprising information for the second wireless device to decode a data transmission on a sidelink data channel. The method further includes transmitting the data transmission over the sidelink data channel to the second wireless device. The method further includes determining that only one of either feedback can be received from the second wireless device or a second transmission can be transmitted, wherein the feedback is indicative of whether the data transmission is successfully decoded by the second wireless device. The method further includes independently, at the first wireless device, determining to either receive the feedback from the second wireless device or transmit the second transmission.

Certain aspects provide a non-transitory computer-readable storage medium having instructions stored thereon for performing a method of wireless communication by a first wireless device. The method generally includes transmitting control information over a sidelink control channel to a second wireless device, the control information comprising information for the second wireless device to decode a data transmission on a sidelink data channel. The method further includes transmitting the data transmission over the sidelink data channel to the second wireless device. The method further includes determining that only one of either feedback can be received from the second wireless device or a second transmission can be transmitted, wherein the feedback is indicative of whether the data transmission is successfully decoded by the second wireless device. The method further includes receiving the feedback from the second wireless device.

Certain aspects provide a non-transitory computer-readable storage medium having instructions stored thereon for performing a method of wireless communication by a first wireless device. The method generally includes transmitting control information over a sidelink control channel to a second wireless device, the control information comprising information for the second wireless device to decode a data transmission on a sidelink data channel. The method further includes transmitting the data transmission over the sidelink data channel to the second wireless device. The method further includes determining that only one of either feedback can be received from the second wireless device or a second transmission can be transmitted, wherein the feedback is indicative of whether the data transmission is successfully decoded by the second wireless device. The method further includes transmitting the second transmission.

Certain aspects provide a non-transitory computer-readable storage medium having instructions stored thereon for performing a method of wireless communication by a first wireless device. The method generally includes transmitting control information over a sidelink control channel to a second wireless device, the control information comprising information for the second wireless device to decode a data transmission on a sidelink data channel. The method further includes transmitting the data transmission over the sidelink data channel to the second wireless device. The method further includes determining that only one of either feedback can be received from the second wireless device or a second transmission can be transmitted, wherein the feedback is indicative of whether the data transmission is successfully decoded by the second wireless device. The method further includes either receiving the feedback or transmitting the second transmission based on a comparison of a priority of the data transmission and a priority of the second transmission.

Certain aspects provide a method for wireless communication by a first wireless device. The method generally includes: receiving control information over a sidelink control channel from a second wireless device, the control information comprising information for decoding a data transmission on a sidelink data channel; and when only one of either feedback can be transmitted to the second wireless device or a second communication can be communicated, wherein the feedback is indicative of whether the data transmission is successfully decoded by the first wireless device: transmitting the feedback to the second wireless device when a priority associated with the feedback is higher than a priority associated with the second communication; and communicating the second communication when the priority associated with the second communication is higher than the priority associated with the feedback.

Certain aspects provide a method for wireless communication by a first wireless device. The method generally includes: transmitting control information over a sidelink control channel to a second wireless device, the control information comprising information for the second wireless device to decode a data transmission on a sidelink data channel; transmitting the data transmission over the sidelink data channel to the second wireless device; and when only one of either feedback can be received from the second wireless device or a second communication can be communicated, wherein the feedback is indicative of whether the data transmission is successfully decoded by the second wireless device: receiving the feedback from the second wireless device when a priority associated with the feedback is higher than a priority associated with the second communication; and communicating the second communication when the priority associated with the second communication is higher than the priority associated with the feedback.

Certain aspects provide a first wireless device comprising a memory and a processor coupled to the memory. The memory and the processor are configured to: receive control information over a sidelink control channel from a second wireless device, the control information comprising information for decoding a data transmission on a sidelink data channel; and when only one of either feedback can be transmitted to the second wireless device or a second communication can be communicated, wherein the feedback is indicative of whether the data transmission is successfully decoded by the first wireless device: transmit the feedback to the second wireless device when a priority associated with the feedback is higher than a priority associated with the second communication; and communicate the second communication when the priority associated with the second communication is higher than the priority associated with the feedback.

Certain aspects provide a first wireless device comprising a memory and a processor coupled to the memory. The memory and the processor are configured to: transmit control information over a sidelink control channel to a second wireless device, the control information comprising information for the second wireless device to decode a data transmission on a sidelink data channel; transmit the data transmission over the sidelink data channel to the second wireless device; and when only one of either feedback can be received from the second wireless device or a second communication can be communicated, wherein the feedback is indicative of whether the data transmission is successfully decoded by the second wireless device: receive the feedback from the second wireless device when a priority associated with the feedback is higher than a priority associated with the second communication; and communicate the second communication when the priority associated with the second communication is higher than the priority associated with the feedback.

Certain aspects provide a first wireless device comprising: means for receiving control information over a sidelink control channel from a second wireless device, the control information comprising information for decoding a data transmission on a sidelink data channel; and when only one of either feedback can be transmitted to the second wireless device or a second communication can be communicated, wherein the feedback is indicative of whether the data transmission is successfully decoded by the first wireless device: means for transmitting the feedback to the second wireless device when a priority associated with the feedback is higher than a priority associated with the second communication; and means for communicating the second communication when the priority associated with the second communication is higher than the priority associated with the feedback.

Certain aspects provide a first wireless device comprising: means for transmitting control information over a sidelink control channel to a second wireless device, the control information comprising information for the second wireless device to decode a data transmission on a sidelink data channel; means for transmitting the data transmission over the sidelink data channel to the second wireless device; and when only one of either feedback can be received from the second wireless device or a second communication can be communicated, wherein the feedback is indicative of whether the data transmission is successfully decoded by the second wireless device: means for receiving the feedback from the second wireless device when a priority associated with the feedback is higher than a priority associated with the second communication; and means for communicating the second communication when the priority associated with the second communication is higher than the priority associated with the feedback.

Certain aspects provide a non-transitory computer-readable storage medium having instructions stored thereon for performing a method of wireless communication by a first wireless device. The method generally includes: receiving control information over a sidelink control channel from a second wireless device, the control information comprising information for decoding a data transmission on a sidelink data channel; and when only one of either feedback can be transmitted to the second wireless device or a second communication can be communicated, wherein the feedback is indicative of whether the data transmission is successfully decoded by the first wireless device: transmitting the feedback to the second wireless device when a priority associated with the feedback is higher than a priority associated with the second communication; and communicating the second communication when the priority associated with the second communication is higher than the priority associated with the feedback.

Certain aspects provide a non-transitory computer-readable storage medium having instructions stored thereon for performing a method of wireless communication by a first wireless device. The method generally includes: transmitting control information over a sidelink control channel to a second wireless device, the control information comprising information for the second wireless device to decode a data transmission on a sidelink data channel; transmitting the data transmission over the sidelink data channel to the second wireless device; and when only one of either feedback can be received from the second wireless device or a second communication can be communicated, wherein the feedback is indicative of whether the data transmission is successfully decoded by the second wireless device: receiving the feedback from the second wireless device when a priority associated with the feedback is higher than a priority associated with the second communication; and communicating the second communication when the priority associated with the second communication is higher than the priority associated with the feedback.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by one UE described herein, for example, by another UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
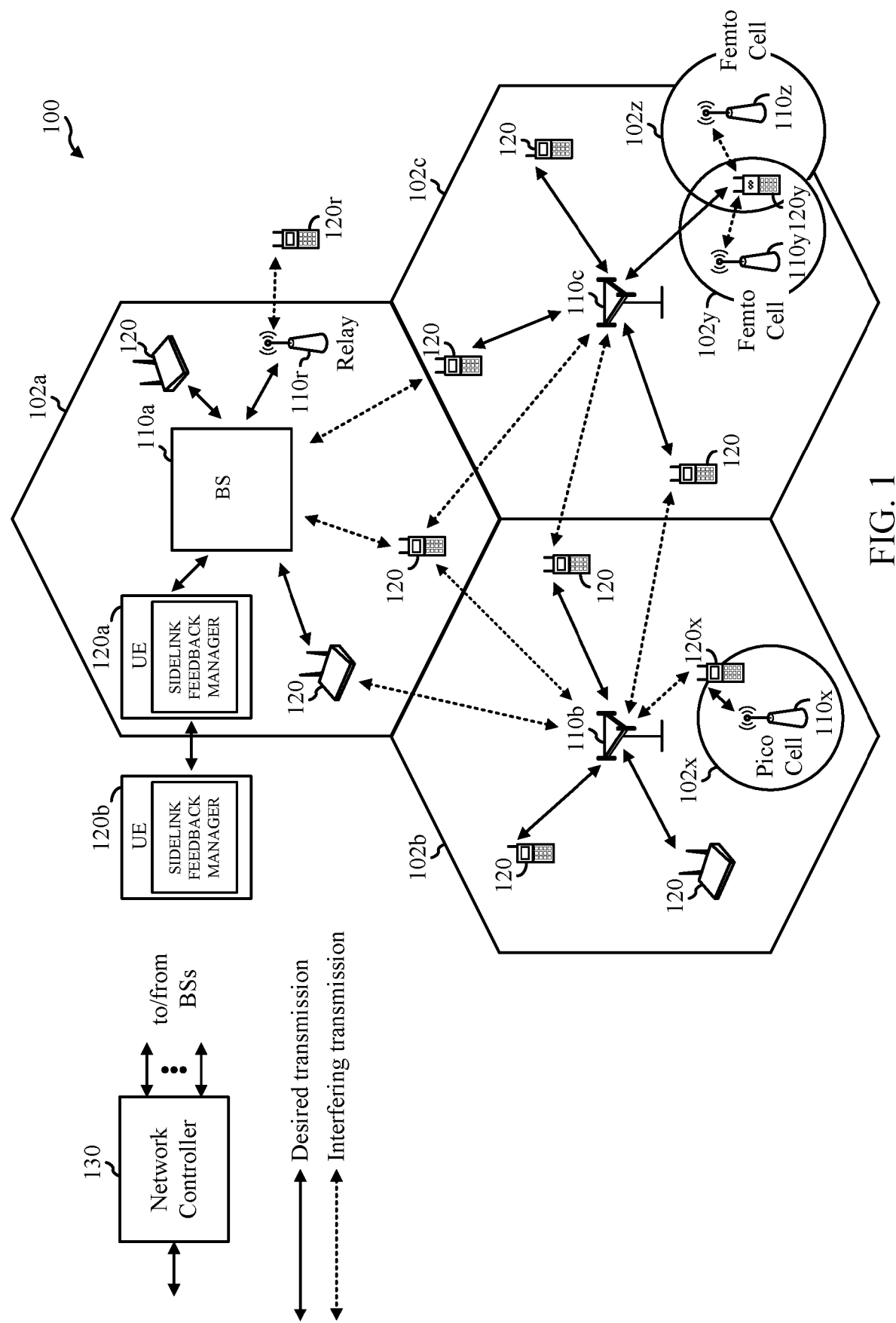
FIG. 1 is a block diagram conceptually illustrating an example telecommunications system, in accordance with certain aspects of the present disclosure.

Aspects of the present disclosure provide apparatus, methods, processing systems, and computer readable mediums for communicating feedback for data transmissions (e.g., over a sidelink) in a wireless communication system.

In certain aspects, wireless devices (e.g., UEs) are configured to communicate (e.g., over a sidelink) between one another as discussed. In certain aspects, different types of (e.g., sidelink) communication between wireless devices may occur over different channels. For example, control information may be transmitted over a (e.g., sidelink) control channel (e.g., physical sidelink control channel (PSCCH)) from a first wireless device, which may be referred to as the originating wireless device, to a second wireless device, which may be referred to as a feedback wireless device. Further, data may be transmitted as a data transmission over a (e.g., sidelink) data channel (e.g., physical sidelink shared channel (PSSCH)) from the originating wireless device to the feedback wireless device.

In certain aspects, the control information includes information for receiving and/or decoding the data transmission. For example, the control information includes one or more of an indication of resources (e.g., time and/or frequency resources, resource blocks, resource elements, symbols, tones, etc.), modulation scheme, coding rate, etc. used for communicating the data transmission.

In certain aspects, the feedback wireless device is configured to provide feedback to the originating wireless devices indicating whether the feedback wireless device successfully decoded (e.g., and received) the data transmission from the originating wireless device. The feedback wireless device may transmit the feedback to the originating wireless device over a (e.g., sidelink) feedback channel (e.g., a physical sidelink feedback channel (PSFCH)). In certain aspects, the feedback for a data transmission in a given data channel indicated by control information in a given control channel is sent in a different time period (e.g., slot) than the given data channel and the given control channel, meaning the data transmission and feedback are not in a self-contained time period (e.g., slot).

In certain aspects, one or both of the originating wireless device and the feedback wireless device may use half-duplex communication (e.g., on the sidelink), meaning it cannot both receive and transmit simultaneously, and instead can only either receive or transmit at a given time. In certain aspects, the originating wireless device and the feedback wireless device may use time division duplexing (TDD) for communicating with one another (e.g., on the sidelink), and therefore at a given time, communication is only in one direction between the originating wireless device and the feedback wireless device.

In certain aspects, the feedback wireless device, at a time when it is supposed to (e.g., scheduled to) transmit the feedback to the originating wireless device, also is supposed to (e.g., scheduled to) receive a second transmission. The second transmission may be over a sidelink, a network transmission via a BS, etc. Further, the second transmission may include control information, data, different feedback, etc. For example, transmission of the feedback by the feedback wireless device and reception of the second transmission by the feedback wireless device may be scheduled on one or more inconsistent (e.g., scheduling conflicting in time, resources overlapping in time, etc.) resources (e.g., time resources). In certain aspects, a scheduling of one or more resources for use by a device is therefore inconsistent, meaning multiple communications (e.g., one transmission and one reception) are scheduled on one or more resources for the device, while the device is unable to perform all of the multiple communications at the same time on the one or more resources. Accordingly, in certain aspects, the feedback wireless device can only one of either transmit the feedback to the originating wireless device or receive the second transmission. Therefore, certain aspects herein provide techniques for selecting (e.g., prioritizing, determining, configuring, etc.) by the feedback wireless device to one of either transmit the feedback to the originating wireless device or receive the second transmission.

In certain aspects, the originating wireless device, at a time when it is supposed to (e.g., scheduled to) receive the feedback to the feedback wireless device, also is supposed to (e.g., scheduled to) to transmit a second transmission. The second transmission may be over a sidelink, a network transmission via a BS, etc. Further, the second transmission may include control information, data, different feedback, etc. For example, reception of the feedback by the originating wireless device and transmission of the second transmission by the originating wireless device may be scheduled on one or more inconsistent (e.g., conflicting, overlapping, etc.) resources (e.g., time resources). Accordingly, in certain aspects, the originating wireless device can only one of either receive the feedback from the feedback wireless device or transmit the second transmission. Therefore, certain aspects herein provide techniques for selecting (e.g., prioritizing, determining, configuring, etc.) by the originating wireless device to one of either receive the feedback from the feedback wireless device or transmit the second transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network).

For example, as shown in FIG. 1, each of the UEs 120a and 120b include a sidelink feedback manager that may be configured for controlling communicating feedback for data transmissions over a sidelink between one another, according to aspects described herein. In particular, as shown, UEs 120a and 120b are configured to communicate with one another over a sidelink.

As illustrated in FIG. 1, the wireless communication network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more entities. That is, for scheduled communication, entities utilize resources allocated by the scheduling entity. Base stations are not the only entities that may function as a scheduling entity. In some examples, a UE may function as a scheduling entity and may schedule resources for one or more entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more entities (e.g., UEs 120a and 120b) may communicate with each other using sidelink signals.

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

In a further aspect of the wireless communication network 100, sidelink signals may be used between UEs 120 without necessarily relying on scheduling or control information from a BS 110. For example, two or more UEs (e.g., UE 120a and 120b) may communicate with each other using peer to peer (P2P) or sidelink signals without relaying that communication through BS 110. In another example, a UE 120 may function as a scheduling entity in a device-to-device (D2D), peer-to-peer (P2P), or vehicle-to-everything (V2X) network, and/or in a mesh network. In a mesh network example, UEs 120a and 120b may optionally communicate directly with one another in addition to communicating with the BS 110a. Thus, in a wireless communication system with scheduled access to time-frequency resources and having a cellular configuration, a P2P configuration, or a mesh configuration, a BS 110 and one or more UEs 120 may communicate utilizing the scheduled resources.

Transmissions over the air interface from a BS 110 to one or more UEs 120, or between a first UE (e.g., UE 120a) and a second UE (e.g., UE 120b) may be referred to as downlink transmission. In accordance with certain aspects of the present disclosure, the term downlink may refer to a pointto-multipoint transmission originating at a scheduling entity (described further below; e.g., base station 110). Another way to describe this scheme may be to use the term broadcast channel multiplexing. Transmissions from a UE 120 to a BS 110 may be referred to as uplink transmissions. In accordance with further aspects of the present disclosure, the term uplink may refer to a point-to-point transmission originating at a UE 120 (e.g., sidelink and V2X communications).

Figure 2:
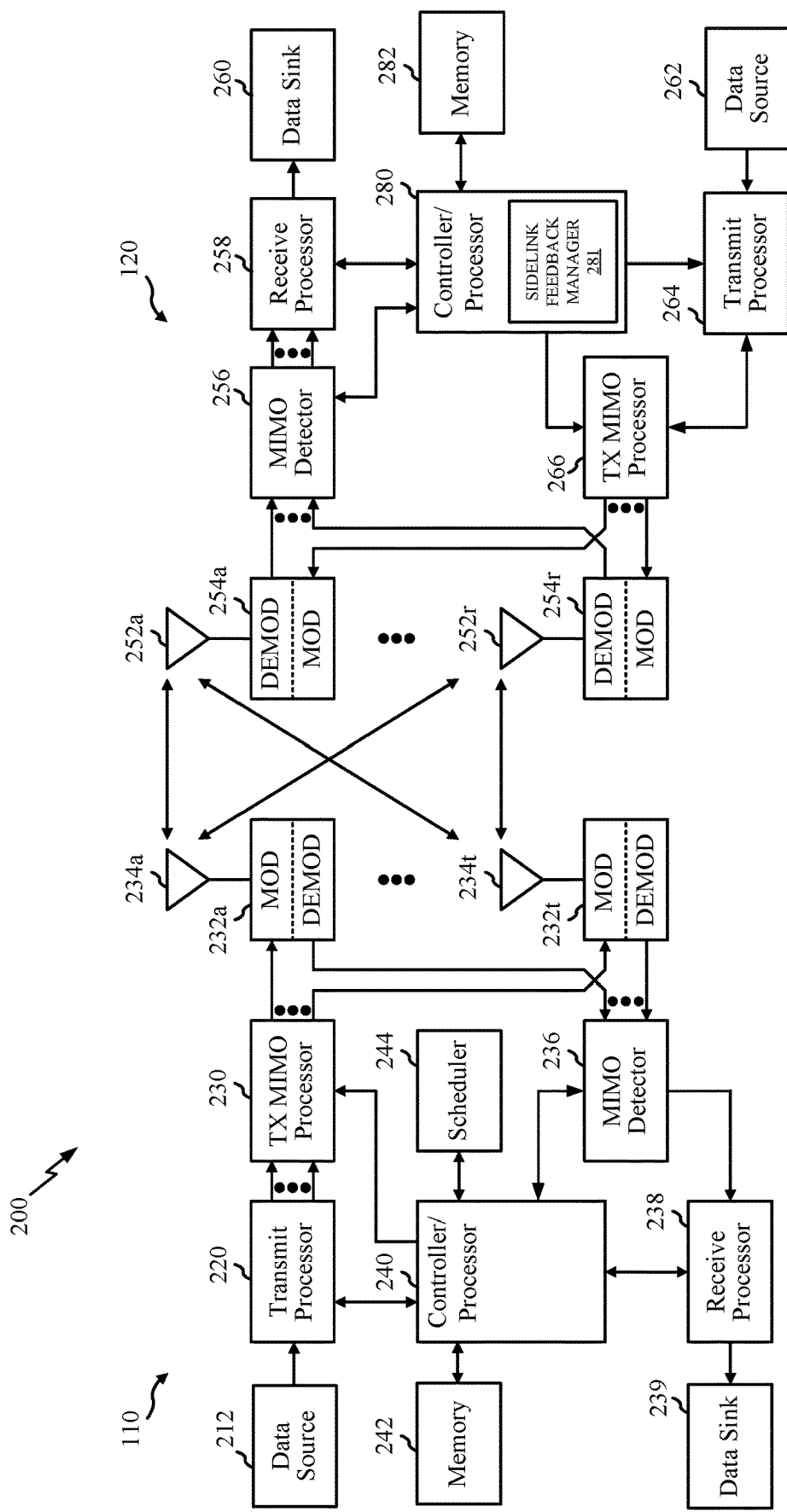
FIG. 2 is a block diagram illustrating an example architecture of a distributed radio access network (RAN), in accordance with certain aspects of the present disclosure.

FIG. 2 illustrates example components of BS 110 and UE 120 (e.g., UE 120a and UE 120b) (e.g., in the wireless communication network 100 of FIG. 1), which may be used to implement aspects of the present disclosure. It should be noted that though FIG. 2 illustrates UE 120 communicating with a BS 110, UE 120 may similarly communicate with another UE over a sidelink. For example, antennas 252, processors 266, 258, 264, and/or controller/processor 280 of the UE 120 may be used to perform the various techniques and methods described herein. For example, as shown in FIG. 2, the controller/processor 280 of the UE 120 has a sidelink feedback manager 281 that may be configured for controlling communicating feedback for data transmissions over a sidelink with another UE, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive downlink signals from the BS 110 or sidelink signals from another UE and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink or a sidelink, at UE 120, a transmit processor 264 may receive and process data (e.g., for the physical uplink shared channel (PUSCH) or the PSSCH) from a data source 262 and control information (e.g., for the physical uplink control channel (PUCCH) or the PSCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110 or another UE.

At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 280 and/or other processors and modules at the UE 120 may perform or direct the execution of processes for the techniques described herein. The memories 242 and 282 may store data and program codes for BS 110 and UE 120, respectively. A scheduler 244 may schedule UEs for data transmission on the downlink and/or uplink. However, a schedule 244 may not be used to schedule UEs for data transmission on a sidelink.

Example Feedback Communication on a Sidelink

As discussed, UE 120a and UE 120b may communicate over a sidelink. In one example, UE 120a acts as an originating wireless device and UE 120b acts as a feedback wireless device. In particular, in certain aspects, UE 120a transmits control information over a sidelink control channel to the UE 120b, the control information including information for receiving and/or decoding a data transmission. Further, the UE 120a transmits the data transmission over a sidelink data channel to the UE 120b.

The UE 120b, acting as the feedback wireless device, is configured to transmit feedback (e.g., over a sidelink feedback channel) to the UE 120a indicating whether the UE 120b successfully decoded (e.g., and received) the data transmission from the UE 120a.

In certain aspects, UE 120b does not transmit feedback to the UE 120a if it is unable to successfully decode (e.g., and receive) the control information corresponding to the data transmission. In particular, without the control information, UE 120b is unable to determine there is a data transmission for which the UE 120b needs to send feedback to the UE 120a.

In certain aspects, the UE 120b is configured to utilize negative acknowledgement (NACK)-based feedback. In such aspects, the feedback comprises a NACK indicating that the UE 120b did not successfully decode (e.g., and receive) the data transmission (e.g., for which it successfully decoded (e.g., and received) the corresponding control information). In particular, in NACK-based feedback, UE 120b transmits the NACK as feedback to the UE 120a indicating that the UE 120b did not successfully decode (e.g., and receive) the data transmission. In certain aspects, the UE 120a, upon receiving the NACK, retransmits the data transmission to the UE 120b.

In certain aspects of NACK-based feedback, the UE 120*b* does not transmit feedback to the UE 120*a* if it is able to successfully decode (e.g., and receive) both the data transmission and its corresponding control information. Accordingly, in certain such aspects, UE 120*a* assumes that the UE 120*b* successfully decoded (e.g., and received) the data transmission if the UE 120*a* does not receive feedback and therefore does not retransmit the data transmission to the UE 120*b*.

In certain aspects, the UE 120*b* is configured to utilize acknowledgement (ACK)-based feedback. In such aspects, the feedback comprises an ACK indicating that the UE 120*b* successfully decoded (e.g., and received) the data transmission (e.g., for which it successfully decoded (e.g., and received) the corresponding control information). In particular, in ACK-based feedback, UE 120*b* transmits the ACK as feedback to the UE 120*a* indicating that the UE 120*b* successfully decoded (e.g., and received) the data transmission. In certain aspects, the UE 120*a*, upon receiving the ACK, does not retransmit the data transmission to the UE 120*b*.

In certain aspects of ACK-based feedback, where UE 120*b* did not successfully decode (e.g., and receive) the data transmission (e.g., for which it successfully decoded (e.g., and received) the corresponding control information), UE 120*b* transmits a NACK to the UE 120*a*. In certain aspects, the UE 120*a*, upon receiving the NACK and/or not receiving an ACK, retransmits the data transmission to the UE 120*b*.

In certain aspects of ACK-based feedback, where UE 120*b* did not successfully decode (e.g., and receive) the data transmission (e.g., for which it successfully decoded (e.g., and received) the corresponding control information), UE 120*b* does not transmit feedback to the UE 120*a*. In certain aspects, the UE 120*a*, upon not receiving an ACK, retransmits the data transmission to the UE 120*b*.

In certain aspects, NACK-based feedback is beneficial where UE 120*a*, as the originating wireless device, is transmitting the data transmission to one or more feedback wireless devices where it does not know how many or which feedback wireless devices may be receiving the data transmission (e.g., such as in a broadcast or groupcast transmission that may target an open or dynamic group). Accordingly, the UE 120*a* does not know from which feedback wireless devices it should expect an ACK to determine whether to retransmit the data transmission. Therefore, relying on a NACK in such a situation allows UE 120*a* to only retransmit the data transmission to any feedback wireless devices (known or not) from which a NACK is received by the UE 120*a*. For similar reasons, ACK-based feedback may be beneficial where UE 120*a*, as the originating wireless device, is transmitting the data transmission to one or more known feedback wireless devices (e.g., such as in a fixed group, unicast, or multicast).

As discussed, in certain aspects, the feedback wireless device, such as UE 120*b*, can only one of either transmit feedback to the originating wireless device, such as UE 120*a*, or receive a second transmission. Therefore, certain aspects herein provide techniques for selecting (e.g., prioritizing, determining, configuring, etc.) by the feedback wireless device to one of either transmit the feedback to the originating wireless device or receive the second transmission.

In certain aspects, if UE 120*b* is configured to utilize ACK-based feedback for a data transmission, UE 120*b* is configured to receive the second transmission and not transmit the feedback to UE 120*a*.

In certain aspects, if UE 120*b* is configured to utilize NACK-based feedback for a data transmission, UE 120*b* is configured to transmit the feedback to UE 120*a* and not receive the second transmission.

In certain aspects, UE 120*b* is configured to utilize either ACK-based or NACK-based feedback for a data transmission based on information included in the control information corresponding to the data transmission indicating which feedback mechanism (e.g., ACK-based or NACK-based) to use.

In certain aspects, each of the data transmission corresponding to the feedback and the second transmission are associated with a priority. For example, each of the data transmission corresponding to the feedback and the second transmission are associated with a quality of service (QoS) corresponding to the priority. In certain aspects, the QoS is based on a QoS indication indicated at a physical (PHY) layer or media access control (MAC) layer of the communication channel used for each of the data transmission and the second transmission. In certain aspects, the QoS is only indicated by the PHY layer but may be determined by higher layers.

In certain aspects, if the data transmission is associated with a higher priority than the second transmission, the UE 120*b* is configured to transmit the feedback to UE 120*a* and not receive the second transmission.

In certain aspects, if the second transmission is associated with a higher priority than the data transmission, the UE 120*b* is configured to receive the second transmission and not transmit the feedback to UE 120*a*.

In certain aspects, if the second transmission and the data transmission have an equal priority, the UE 120*b* is configured to transmit the feedback to UE 120*a* and not receive the second transmission.

In certain aspects, if the second transmission and the data transmission have an equal priority, the UE 120*b* is configured to receive the second transmission and not transmit the feedback to UE 120*a*.

Further, as discussed, in certain aspects, the originating wireless device, such as UE 120*a*, can only one of either receive feedback from the feedback wireless device, such as UE 120*b*, or transmit a second transmission. Therefore, certain aspects herein provide techniques for selecting (e.g., prioritizing, determining, configuring, etc.) by the originating wireless device to one of either receive the feedback from the feedback wireless device or transmit the second transmission.

In certain aspects, the UE 120*a* may independently determine or be configured to determine whether to receive the feedback from UE 120*b*, or transmit the second transmission.

In certain aspects, the UE 120*a* (e.g., always, until reconfigured, etc.) receives the feedback from the UE 120*b* and does not transmit the second transmission.

In certain aspects, the UE 120*a* (e.g., always, until reconfigured, etc.) transmits the second transmission and does not receive the feedback from the UE 120*b*. In certain such aspects, the UE 120*a* assumes that the UE 120*b* did not successfully decode (e.g., and receive) the data transmission. For example, the UE 120*a* automatically retransmits the data transmission to the UE 120*b* (e.g., on the sidelink data channel).

In certain aspects, each of the data transmission corresponding to the feedback and the second transmission are associated with a priority as discussed.

In certain aspects, if the data transmission is associated with a higher priority than the second transmission, the UE 120*a* is configured to receive the feedback from UE 120*b* and not transmit the second transmission.

In certain aspects, if the second transmission is associated with a higher priority than the data transmission, the UE 120*a* is configured to transmit the second transmission and not receive the feedback from the UE 120*b*.

In certain aspects, if the second transmission and the data transmission have an equal priority, the UE 120*a* is configured to receive the feedback from UE 120*b* and not transmit the second transmission.

In certain aspects, if the second transmission and the data transmission have an equal priority, the UE 120*a* is configured to transmit the second transmission and not receive the feedback from the UE 120*b*.

Figure 3:
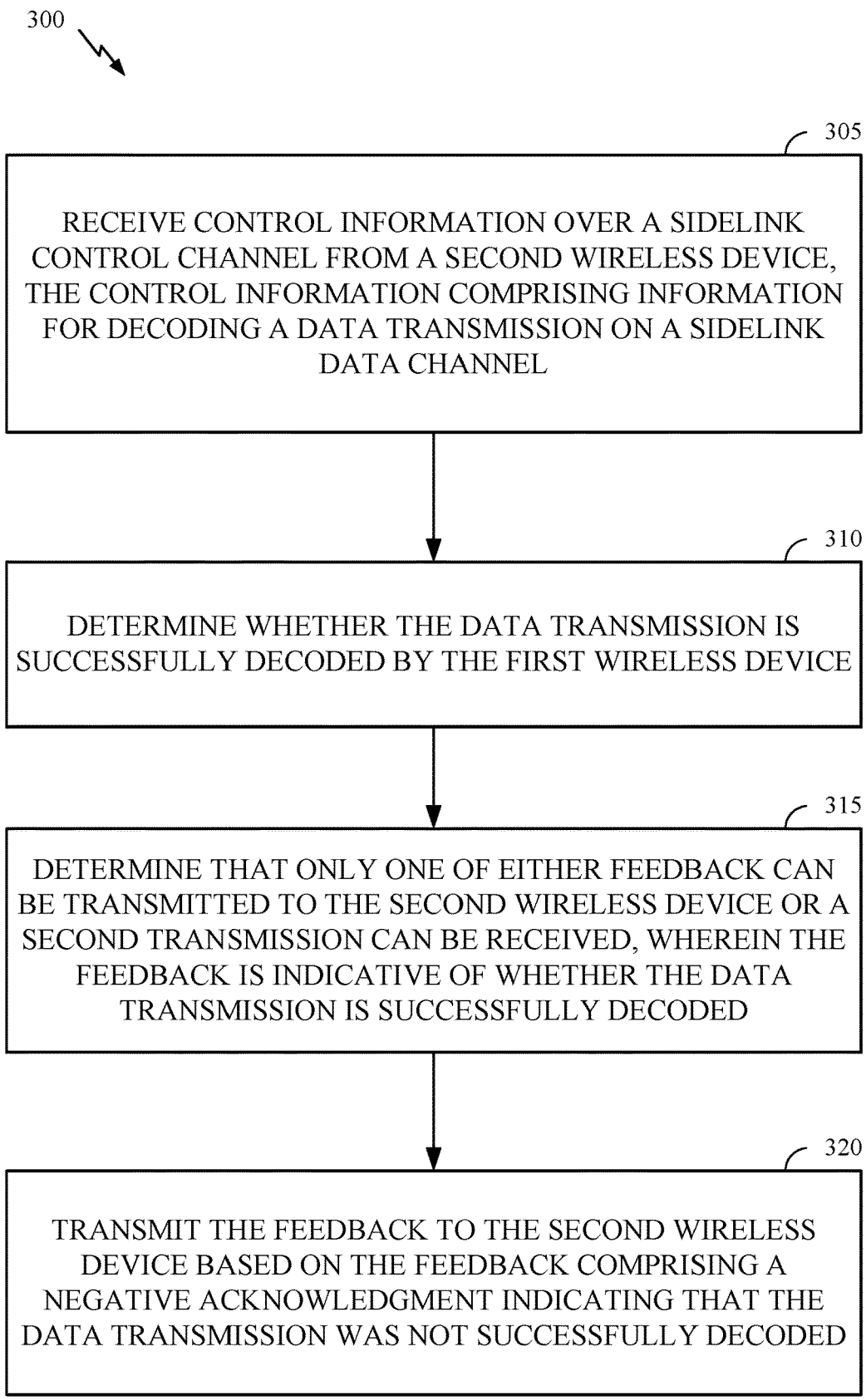
FIG. 3 is a flow diagram illustrating example operations for wireless communication by a first wireless device, in accordance with certain aspects of the present disclosure.

FIG. 3 is a flow diagram illustrating example operations 300 for wireless communication, in accordance with certain aspects of the present disclosure. The operations 300 may be performed, for example, by a first wireless device acting as a feedback wireless device (e.g., such as a UE 120 over a sidelink). Operations 300 may be implemented as software components that are executed and run on one or more processors (e.g., controller/processor 280 of FIG. 2). Further, the transmission and reception of signals by the first wireless device in operations 300 may be enabled, for example, by one or more antennas (e.g., antennas 252 of FIG. 2). In certain aspects, the transmission and/or reception of signals by the first wireless device may be implemented via a bus interface of one or more processors (e.g., controller/processor 280) obtaining and/or outputting signals.

The operations 300 may begin, at 305, by receiving control information over a sidelink control channel from a second wireless device, the control information comprising information for decoding a data transmission on a sidelink data channel. Further, at 310, the first wireless device determines whether the data transmission is successfully decoded by the first wireless device.

Continuing, at 315, the first wireless device determines that only one of either feedback can be transmitted to the second wireless device or a second transmission can be received, wherein the feedback is indicative of whether the data transmission is successfully decoded. At 320, the first wireless device transmits the feedback to the second wireless device based on the feedback comprising a negative acknowledgment indicating that the data transmission was not successfully decoded.

Figure 4:
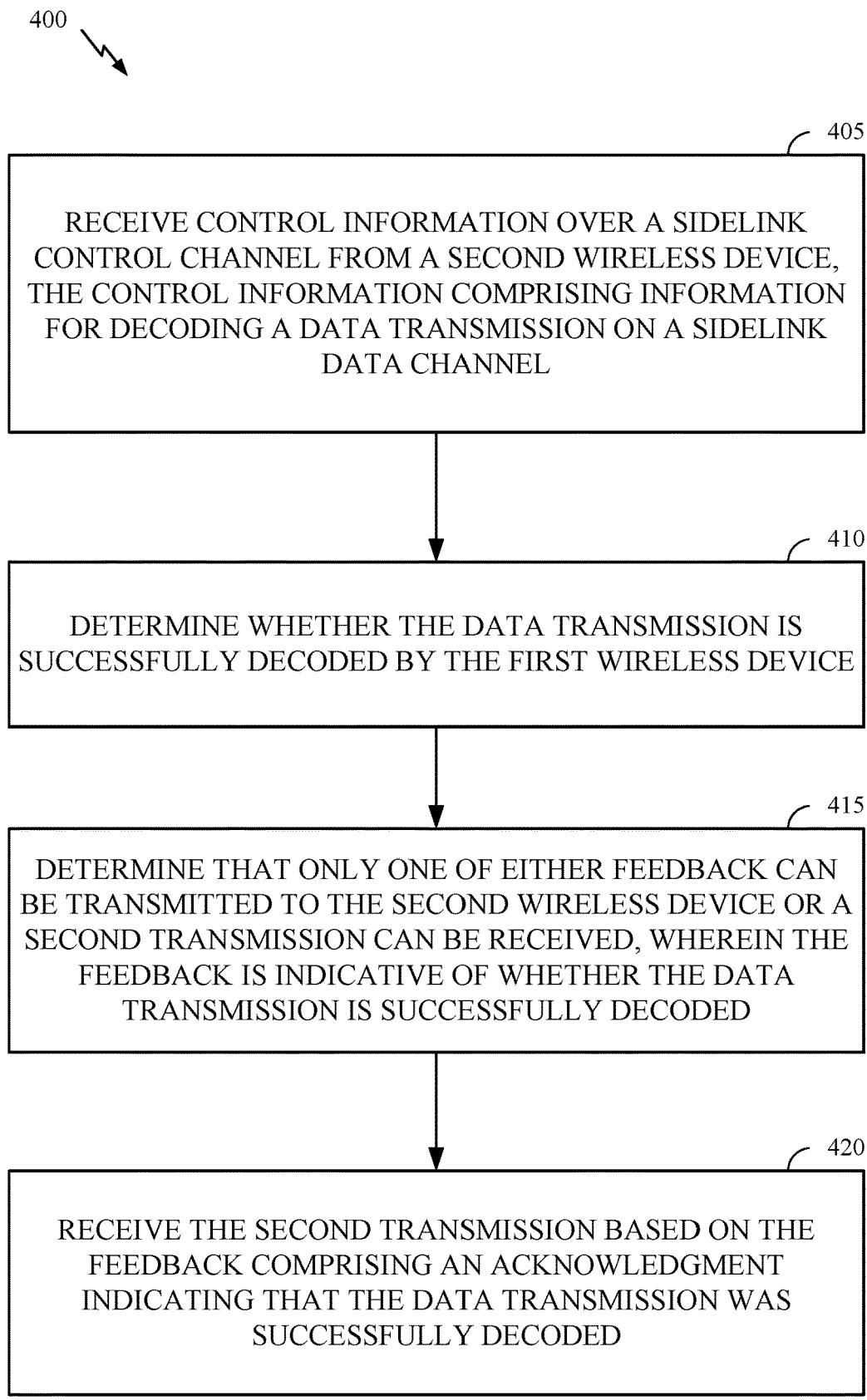
FIG. 4 is a flow diagram illustrating example operations for wireless communication by a first wireless device, in accordance with certain aspects of the present disclosure.

FIG. 4 is a flow diagram illustrating example operations 400 for wireless communication, in accordance with certain aspects of the present disclosure. The operations 400 may be performed, for example, by a first wireless device acting as a feedback wireless device (e.g., such as a UE 120 over a sidelink). Operations 400 may be implemented as software components that are executed and run on one or more processors (e.g., controller/processor 280 of FIG. 2). Further, the transmission and reception of signals by the first wireless device in operations 400 may be enabled, for example, by one or more antennas (e.g., antennas 252 of FIG. 2). In certain aspects, the transmission and/or reception of signals by the first wireless device may be implemented via a bus interface of one or more processors (e.g., controller/processor 280) obtaining and/or outputting signals.

The operations 400 may begin, at 405, by receiving control information over a sidelink control channel from a second wireless device, the control information comprising information for decoding a data transmission on a sidelink data channel. Further, at 410, the first wireless device determines whether the data transmission is successfully decoded by the first wireless device.

Continuing, at 415, the first wireless device determines that only one of either feedback can be transmitted to the second wireless device or a second transmission can be received, wherein the feedback is indicative of whether the data transmission is successfully decoded. At 420, the first wireless device receives the second transmission based on the feedback comprising an acknowledgment indicating that the data transmission was successfully decoded.

Figure 5:
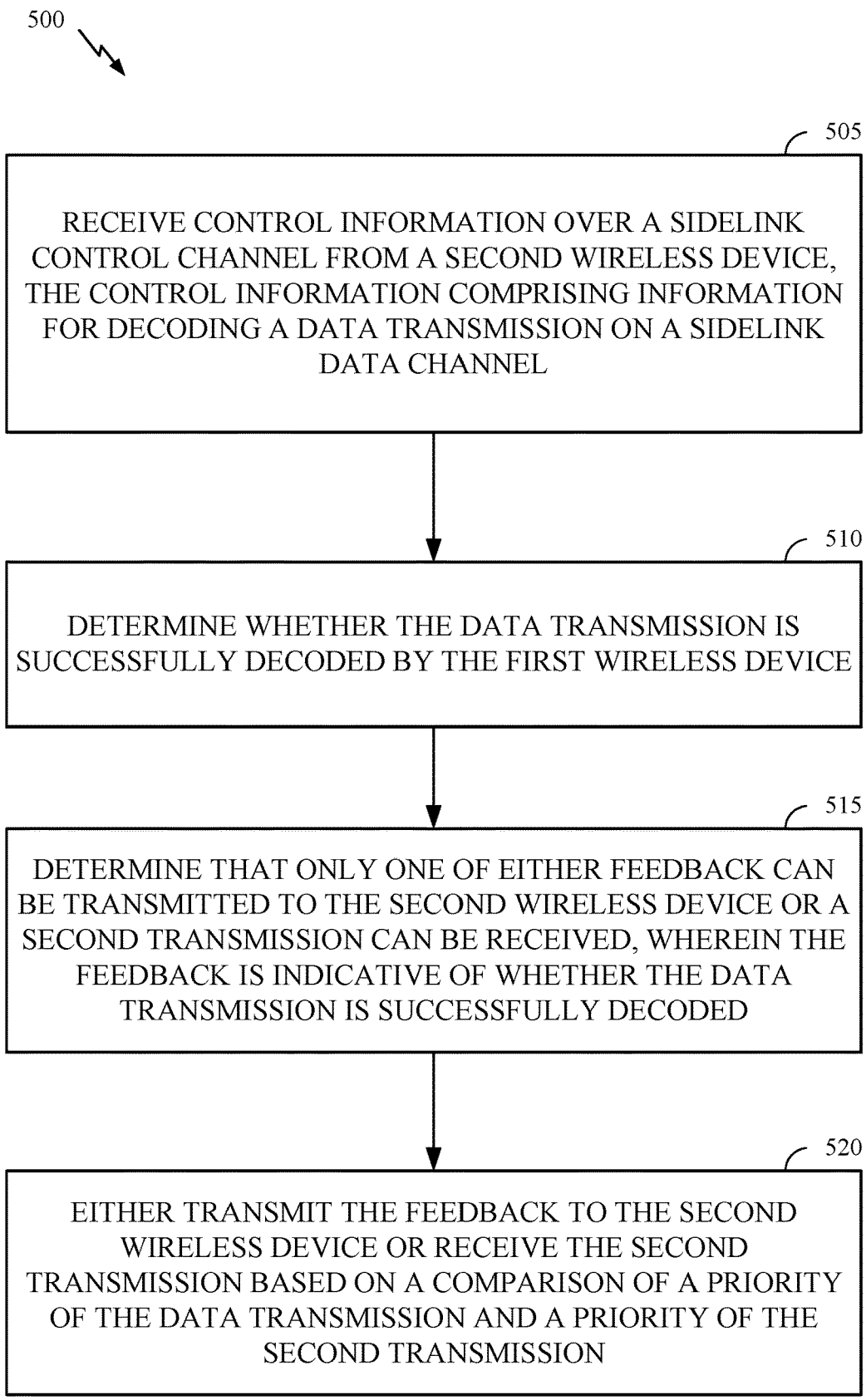
FIG. 5 is a flow diagram illustrating example operations for wireless communication by a first wireless device, in accordance with certain aspects of the present disclosure.

FIG. 5 is a flow diagram illustrating example operations 500 for wireless communication, in accordance with certain aspects of the present disclosure. The operations 500 may be performed, for example, by a first wireless device acting as a feedback wireless device (e.g., such as a UE 120 over a sidelink). Operations 500 may be implemented as software components that are executed and run on one or more processors (e.g., controller/processor 280 of FIG. 2). Further, the transmission and reception of signals by the first wireless device in operations 500 may be enabled, for example, by one or more antennas (e.g., antennas 252 of FIG. 2). In certain aspects, the transmission and/or reception of signals by the first wireless device may be implemented via a bus interface of one or more processors (e.g., controller/processor 280) obtaining and/or outputting signals.

The operations 500 may begin, at 505, by receiving control information over a sidelink control channel from a second wireless device, the control information comprising information for decoding a data transmission on a sidelink data channel. Further, at 510, the first wireless device determines whether the data transmission is successfully decoded by the first wireless device.

Continuing, at 515, the first wireless device determines that only one of either feedback can be transmitted to the second wireless device or a second transmission can be received, wherein the feedback is indicative of whether the data transmission is successfully decoded. At 520, the first wireless device either transmits the feedback to the second wireless device or receives the second transmission based on a comparison of a priority of the data transmission and a priority of the second transmission.

In certain aspects, such as of operations 500, the operations further include transmitting the feedback based on the priority of the data transmission being higher than the priority of the second transmission.

In certain aspects, such as of operations 500, the operations further include receiving the second transmission based on the priority of the second transmission being higher than the priority of the data transmission.

In certain aspects, such as of operations 500, the operations further include transmitting the feedback based on the priority of the data transmission being equal to the priority of the second transmission.

In certain aspects, such as of operations 500, the operations further include receiving the second transmission based on the priority of the second transmission being equal to the priority of the data transmission.

In certain aspects, such as of operations 500, the priority of the data transmission and the priority of the second transmission are based on respective quality of service indications. In certain such aspects, the quality of service indications are indicated at a physical layer level or media access control layer level.

In certain aspects, such as of any of operations 300-500 or 1000, the second transmission is over a sidelink channel.

In certain aspects, such as of any of operations 300-500 or 1000, the first wireless device is configured to communicate using time division duplexing (TDD).

In certain aspects, such as of any of operations 300-500, the first wireless device uses half-duplex communication.

In certain aspects, such as of any of operations 300-500 or 1000, the first wireless device comprises a first user equipment (UE) and wherein the second wireless device comprises a second UE.

In certain aspects, such as of any of operations 300-500 or 1000, the first wireless device receives an indication to transmit the feedback only when the data transmission is not successfully decoded. In certain aspects, the first wireless device receives the indication in a sidelink control message from the second wireless device.

In certain aspects, such as of any of operations 300-500 or 1000, the first wireless device receives an indication to transmit the feedback only when the data transmission is successfully decoded. In certain aspects, the first wireless device receives the indication in a sidelink control message from the second wireless device.

In certain aspects, such as of any of operations 300-500 or 1000, the first wireless device receives an indication to transmit the feedback when the data transmission is successfully decoded and when the data transmission is not successfully decoded. In certain aspects, the first wireless device receives the indication in a sidelink control message from the second wireless device.

In certain aspects, such as of any of operations 300-500 or 1000, the sidelink control channel comprises a physical sidelink control channel, the sidelink data channel comprises a physical sidelink shared channel, and the feedback is communicated over a physical sidelink feedback channel.

In certain aspects, such as of any of operations 300-500 or 1000, the second transmission comprises one of second control information, second data, or second feedback.

Figure 6:
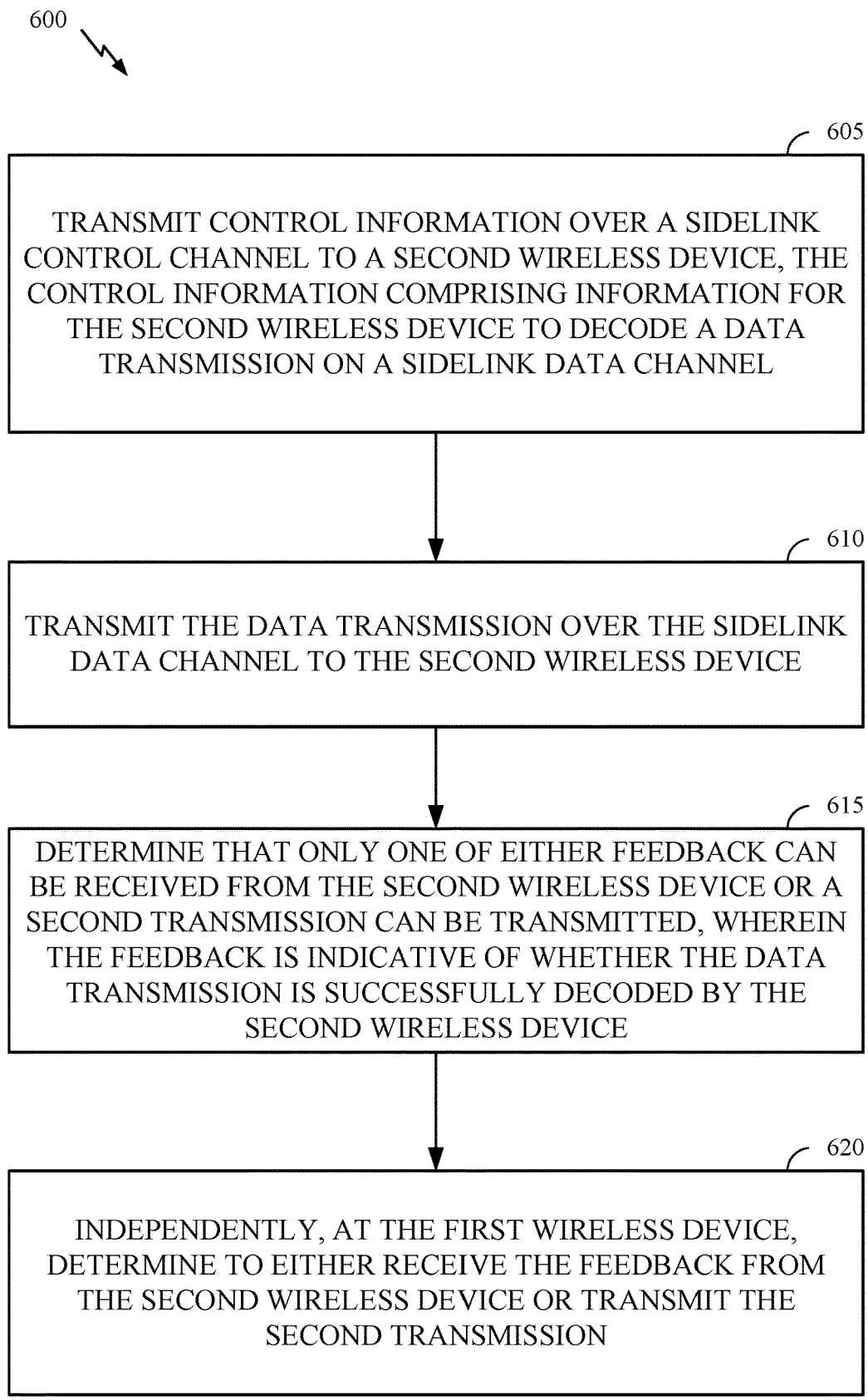
FIG. 6 is a flow diagram illustrating example operations for wireless communication by a first wireless device, in accordance with certain aspects of the present disclosure.

FIG. 6 is a flow diagram illustrating example operations 600 for wireless communication, in accordance with certain aspects of the present disclosure. The operations 600 may be performed, for example, by a first wireless device acting as an originating wireless device (e.g., such as a UE 120 over a sidelink). Operations 600 may be implemented as software components that are executed and run on one or more processors (e.g., controller/processor 280 of FIG. 2). Further, the transmission and reception of signals by the first wireless device in operations 600 may be enabled, for example, by one or more antennas (e.g., antennas 252 of FIG. 2). In certain aspects, the transmission and/or reception of signals by the first wireless device may be implemented via a bus interface of one or more processors (e.g., controller/processor 280) obtaining and/or outputting signals.

The operations 600 may begin, at 605, by transmitting control information over a sidelink control channel to a second wireless device, the control information comprising information for the second wireless device to decode a data transmission on a sidelink data channel. Further, at 610, the first wireless device transmits the data transmission over the sidelink data channel to the second wireless device.

Continuing, at 615, the first wireless device determines that only one of either feedback can be received from the second wireless device or a second transmission can be transmitted, wherein the feedback is indicative of whether the data transmission is successfully decoded by the second wireless device. At 620, the first wireless device independently, at the first wireless device, determines to either receive the feedback from the second wireless device or transmit the second transmission.

Figure 7:
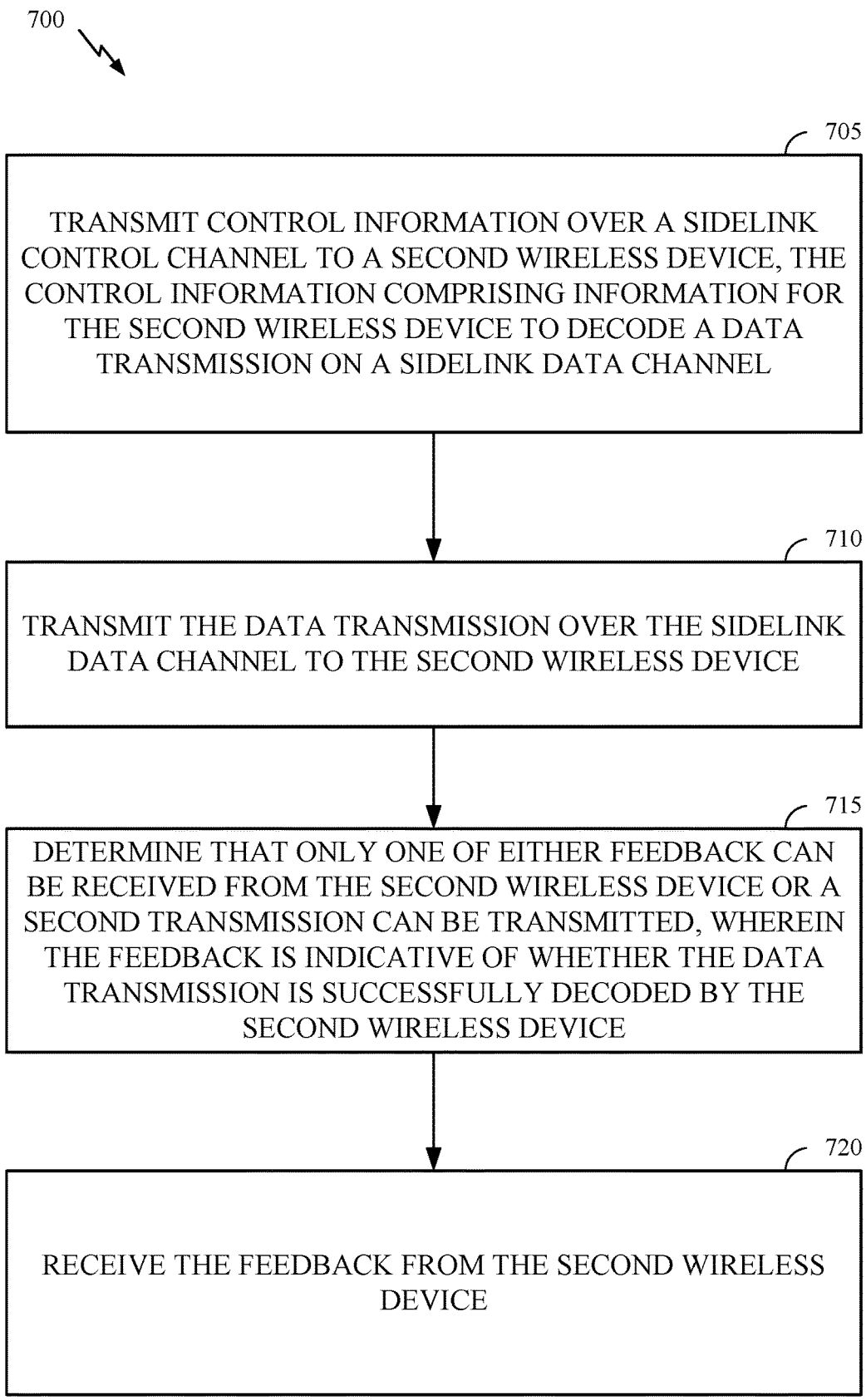
FIG. 7 is a flow diagram illustrating example operations for wireless communication by a first wireless device, in accordance with certain aspects of the present disclosure.

FIG. 7 is a flow diagram illustrating example operations 700 for wireless communication, in accordance with certain aspects of the present disclosure. The operations 700 may be performed, for example, by a first wireless device acting as an originating wireless device (e.g., such as a UE 120 over a sidelink). Operations 700 may be implemented as software components that are executed and run on one or more processors (e.g., controller/processor 280 of FIG. 2). Further, the transmission and reception of signals by the first wireless device in operations 700 may be enabled, for example, by one or more antennas (e.g., antennas 252 of FIG. 2). In certain aspects, the transmission and/or reception of signals by the first wireless device may be implemented via a bus interface of one or more processors (e.g., controller/processor 280) obtaining and/or outputting signals.

The operations 700 may begin, at 705, by transmitting control information over a sidelink control channel to a second wireless device, the control information comprising information for the second wireless device to decode a data transmission on a sidelink data channel. Further, at 710, the first wireless device transmits the data transmission over the sidelink data channel to the second wireless device.

Continuing, at 715, the first wireless device determines that only one of either feedback can be received from the second wireless device or a second transmission can be transmitted, wherein the feedback is indicative of whether the data transmission is successfully decoded by the second wireless device. At 720, the first wireless device receives the feedback from the second wireless device.

Figure 8:
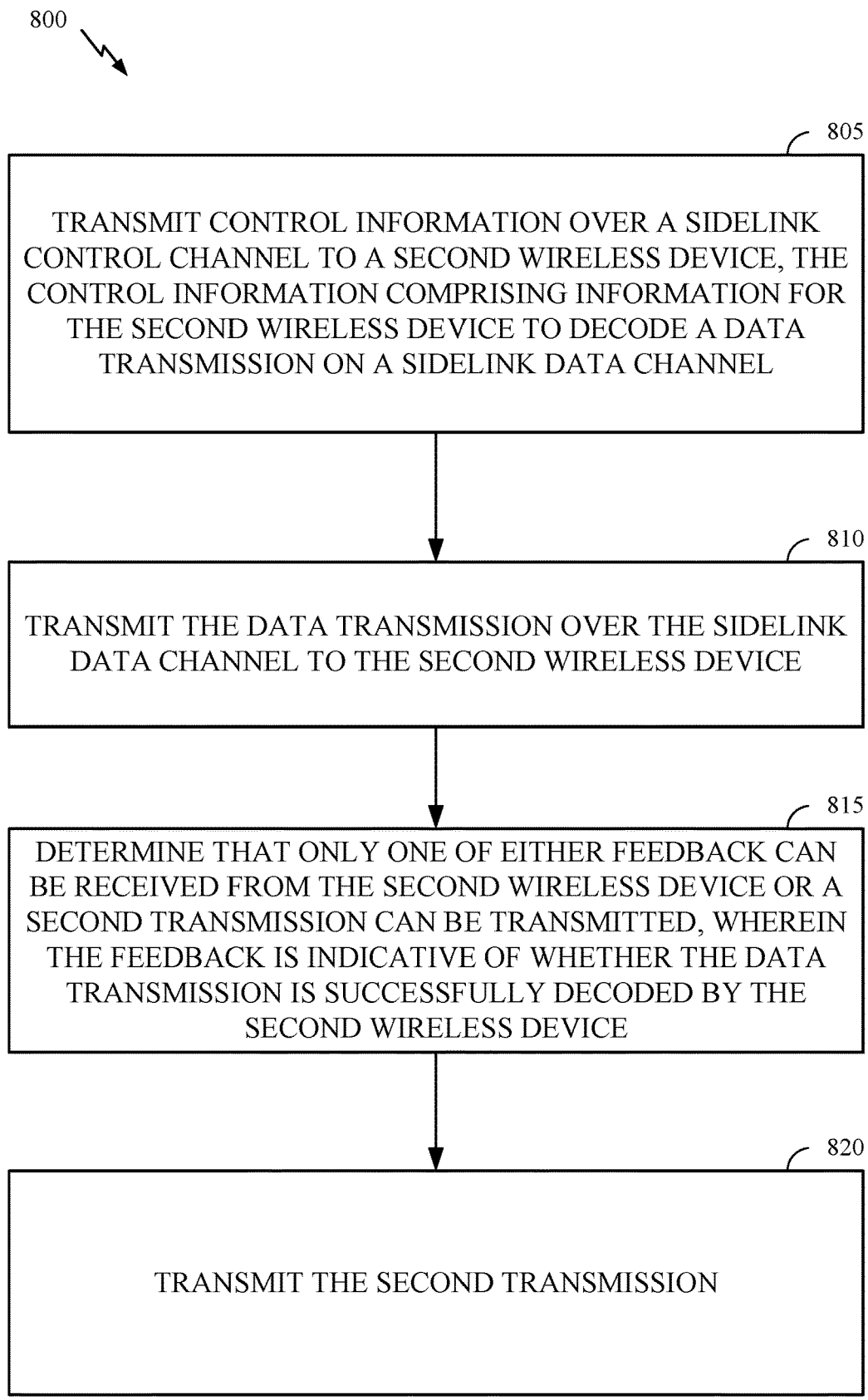
FIG. 8 is a flow diagram illustrating example operations for wireless communication by a first wireless device, in accordance with certain aspects of the present disclosure.

FIG. 8 is a flow diagram illustrating example operations 800 for wireless communication, in accordance with certain aspects of the present disclosure. The operations 800 may be performed, for example, by a first wireless device acting as an originating wireless device (e.g., such as a UE 120 over a sidelink). Operations 800 may be implemented as software components that are executed and run on one or more processors (e.g., controller/processor 280 of FIG. 2). Further, the transmission and reception of signals by the first wireless device in operations 800 may be enabled, for example, by one or more antennas (e.g., antennas 252 of FIG. 2). In certain aspects, the transmission and/or reception of signals by the first wireless device may be implemented via a bus interface of one or more processors (e.g., controller/processor 280) obtaining and/or outputting signals.

The operations 800 may begin, at 805, by transmitting control information over a sidelink control channel to a second wireless device, the control information comprising information for the second wireless device to decode a data transmission on a sidelink data channel. Further, at 810, the first wireless device transmits the data transmission over the sidelink data channel to the second wireless device.

Continuing, at 815, the first wireless device determines that only one of either feedback can be received from the second wireless device or a second transmission can be transmitted, wherein the feedback is indicative of whether the data transmission is successfully decoded by the second wireless device. At 820, the first wireless device transmits the second transmission.

Figure 9:
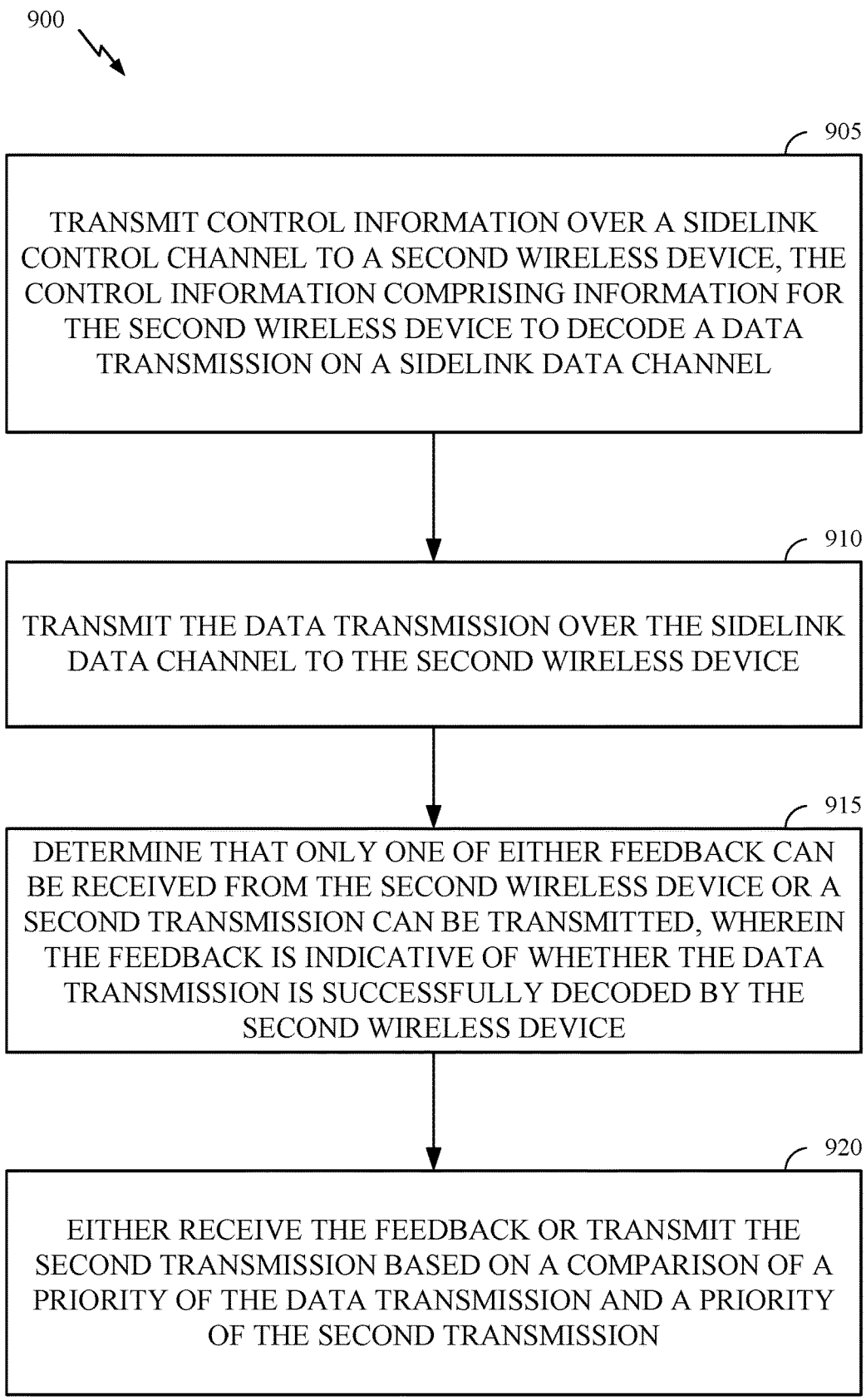
FIG. 9 is a flow diagram illustrating example operations for wireless communication by a first wireless device, in accordance with certain aspects of the present disclosure.

FIG. 9 is a flow diagram illustrating example operations 900 for wireless communication, in accordance with certain aspects of the present disclosure. The operations 900 may be performed, for example, by a first wireless device acting as an originating wireless device (e.g., such as a UE 120 over a sidelink). Operations 900 may be implemented as software components that are executed and run on one or more processors (e.g., controller/processor 280 of FIG. 2). Further, the transmission and reception of signals by the first wireless device in operations 900 may be enabled, for example, by one or more antennas (e.g., antennas 252 of FIG. 2). In certain aspects, the transmission and/or reception of signals by the first wireless device may be implemented via a bus interface of one or more processors (e.g., controller/processor 280) obtaining and/or outputting signals.

The operations 900 may begin, at 905, by transmitting control information over a sidelink control channel to a second wireless device, the control information comprising information for the second wireless device to decode a data transmission on a sidelink data channel. Further, at 910, the first wireless device transmits the data transmission over the sidelink data channel to the second wireless device.

Continuing, at 915, the first wireless device determines that only one of either feedback can be received from the second wireless device or a second transmission can be transmitted, wherein the feedback is indicative of whether the data transmission is successfully decoded by the second wireless device. At 920, the first wireless device either receives the feedback or transmits the second transmission based on a comparison of a priority of the data transmission and a priority of the second transmission.

In certain aspects, such as of operations 900, the operations further include receiving the feedback based on the priority of the data transmission being higher than the priority of the second transmission.

In certain aspects, such as of operations 900, the operations further include transmitting the second transmission based on the priority of the second transmission being higher than the priority of the data transmission.

In certain aspects, such as of operations 900, the operations further include receiving the feedback based on the priority of the data transmission being equal to the priority of the second transmission.

In certain aspects, such as of operations 900, the operations further include transmitting the second transmission based on the priority of the second transmission being equal to the priority of the data transmission.

In certain aspects, such as of operations 900, the priority of the data transmission and the priority of the second transmission are based on respective quality of service indications. In certain such aspects, the quality of service indications are indicated at a physical layer level or media access control layer level.

In certain aspects, such as of operations 900, the operations further include based on transmitting the second transmission, retransmitting the data transmission to the second wireless device on the sidelink data channel.

Figure 10:
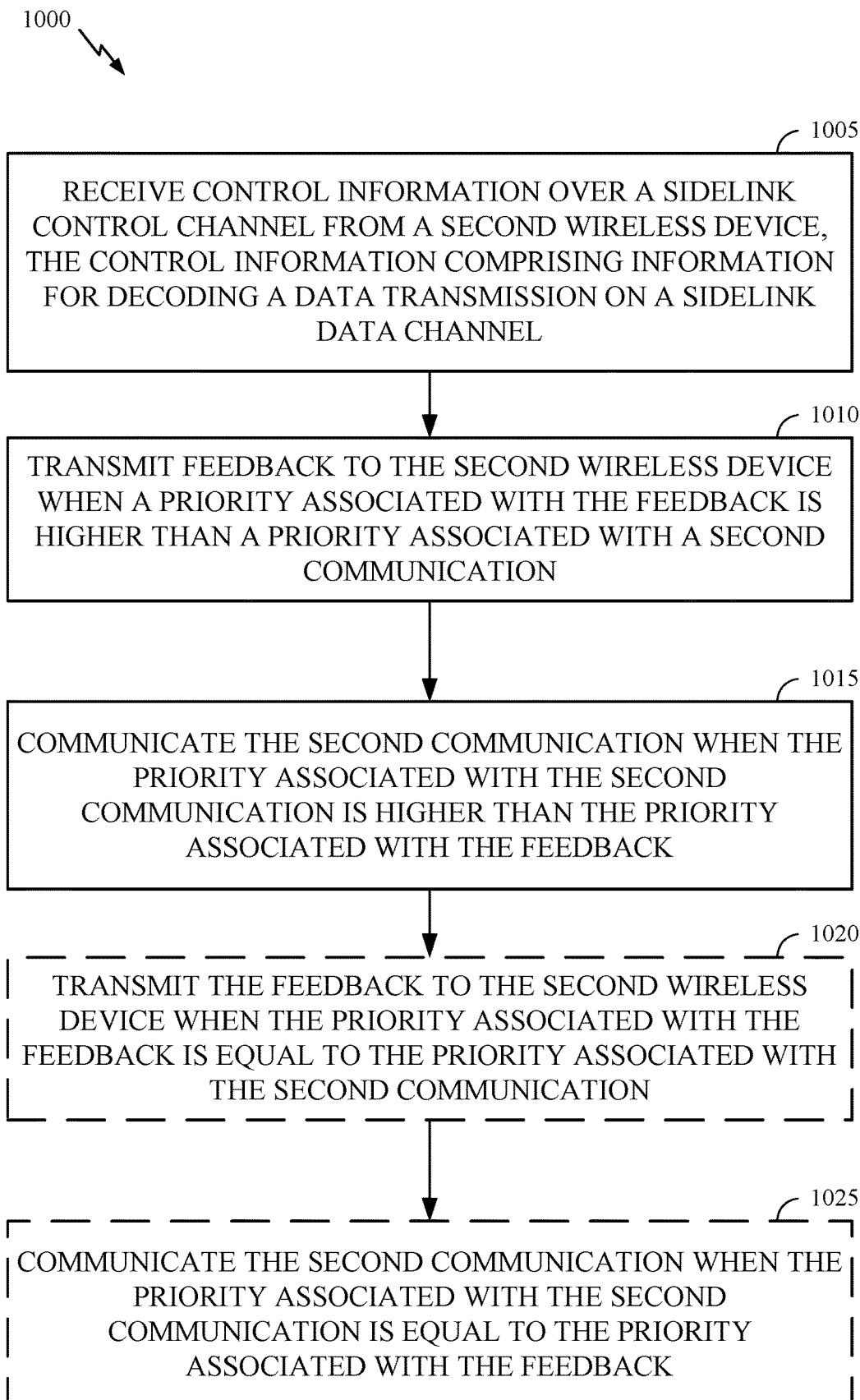
FIG. 10 is a flow diagram illustrating example operations for wireless communication by a first wireless device, in accordance with certain aspects of the present disclosure.

FIG. 10 is a flow diagram illustrating example operations 1000 for wireless communication, in accordance with certain aspects of the present disclosure. The operations 1000 may be performed, for example, by a first wireless device acting as a feedback wireless device (e.g., such as a UE 120 over a sidelink). Operations 1000 may be implemented as software components that are executed and run on one or more processors (e.g., controller/processor 280 of FIG. 2). Further, the transmission and reception of signals by the first wireless device in operations 1000 may be enabled, for example, by one or more antennas (e.g., antennas 252 of FIG. 2). In certain aspects, the transmission and/or reception of signals by the first wireless device may be implemented via a bus interface of one or more processors (e.g., controller/processor 280) obtaining and/or outputting signals.

The operations 1000 may begin, at 1005, by receiving control information over a sidelink control channel from a second wireless device, the control information comprising information for decoding a data transmission on a sidelink data channel. When only one of either feedback can be transmitted to the second wireless device or a second communication can be communicated, wherein the feedback is indicative of whether the data transmission is successfully decoded by the first wireless device, operations 1000 may continue at 1010 by transmitting the feedback to the second wireless device when a priority associated with the feedback is higher than a priority associated with the second communication. Further, operations 1000 may continue at 1015 by communicating the second communication when the priority associated with the second communication is higher than the priority associated with the feedback.

In certain aspects, operations 1000 optionally continue at 1020 by transmitting the feedback to the second wireless device when the priority associated with the feedback is equal to the priority associated with the second communication.

In certain aspects, operations 1000 optionally continue at 1025 instead of 1020 by communicating the second communication when the priority associated with the second communication is equal to the priority associated with the feedback.

Figure 11:
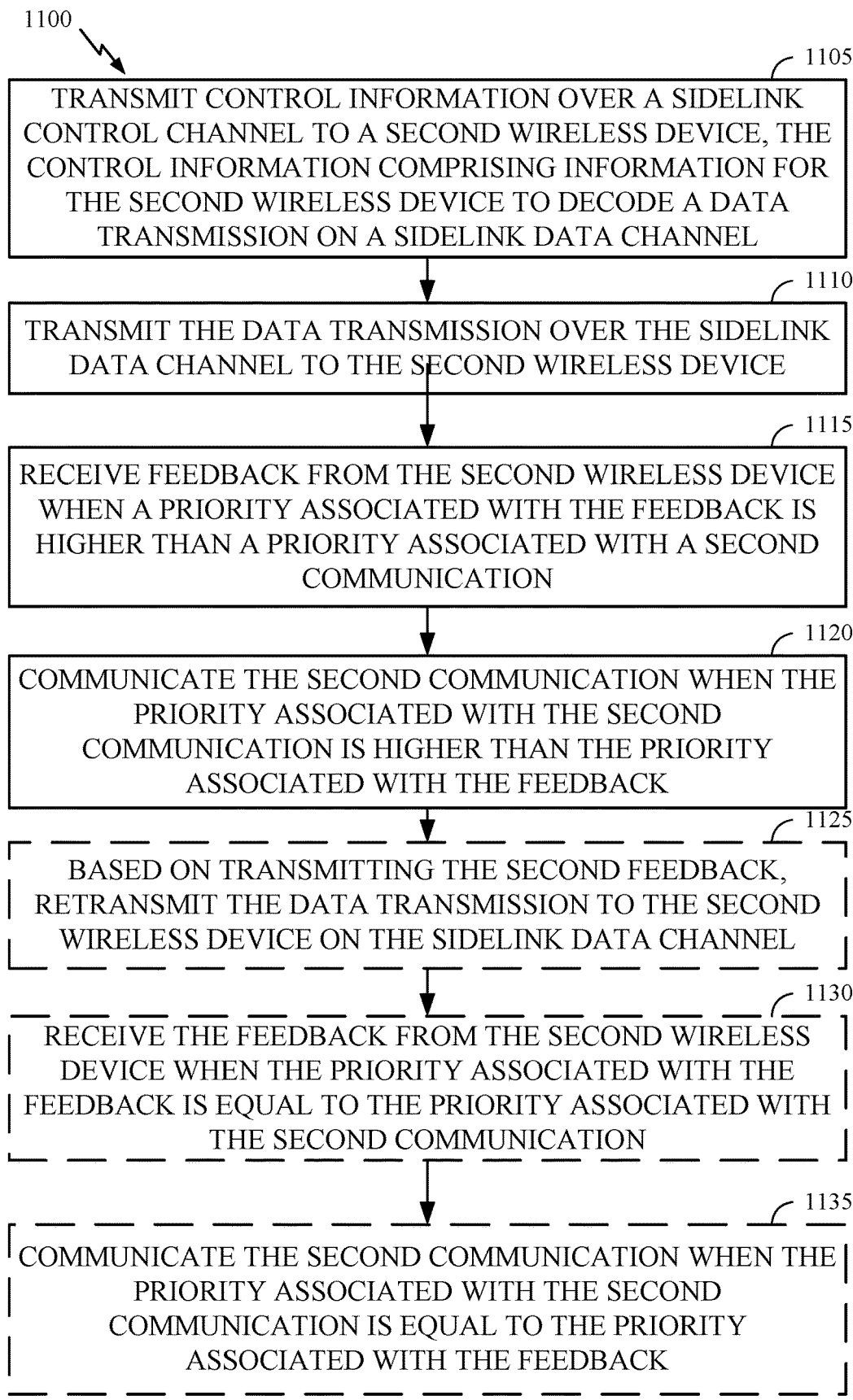
FIG. 11 is a flow diagram illustrating example operations for wireless communication by a first wireless device, in accordance with certain aspects of the present disclosure.

FIG. 11 is a flow diagram illustrating example operations 1100 for wireless communication, in accordance with certain aspects of the present disclosure. The operations 1100 may be performed, for example, by a first wireless device acting as an originating wireless device (e.g., such as a UE 120 over a sidelink). Operations 1100 may be implemented as software components that are executed and run on one or more processors (e.g., controller/processor 280 of FIG. 2). Further, the transmission and reception of signals by the first wireless device in operations 1100 may be enabled, for example, by one or more antennas (e.g., antennas 252 of FIG. 2). In certain aspects, the transmission and/or reception of signals by the first wireless device may be implemented via a bus interface of one or more processors (e.g., controller/processor 280) obtaining and/or outputting signals.

The operations 1100 may begin, at 1105, by transmitting control information over a sidelink control channel to a second wireless device, the control information comprising information for the second wireless device to decode a data transmission on a sidelink data channel. Operations 1100 may continue, at 1110 by transmitting the data transmission over the sidelink data channel to the second wireless device. When only one of either feedback can be received from the second wireless device or a second communication can be communicated, wherein the feedback is indicative of whether the data transmission is successfully decoded by the second wireless device, operations 1100 may continue at 1115 by receiving the feedback from the second wireless device when a priority associated with the feedback is higher than a priority associated with the second communication. Further, operations 1100 may continue at 1120 by communicating the second communication when the priority associated with the second communication is higher than the priority associated with the feedback.

In certain aspects, operations 1100 optionally continue at 1125 by based on transmitting the second feedback, retransmitting the data transmission to the second wireless device on the sidelink data channel.

In certain aspects, operations 1100 optionally continue at 1130 by receiving the feedback from the second wireless device when the priority associated with the feedback is equal to the priority associated with the second communication.

In certain aspects, operations 1100 optionally continue at 11135 instead of 1130 by communicating the second communication when the priority associated with the second communication is equal to the priority associated with the feedback.

In certain aspects, such as any of operations 600-900 or 1100, the second transmission is over a sidelink channel.

In certain aspects, such as any of operations 600-900 or 1100, the first wireless device is configured to communicate using time division duplexing (TDD).

In certain aspects, such as any of operations 600-900, the first wireless device uses half-duplex communication.

In certain aspects, such as any of operations 600-900 or 1100, the first wireless device comprises a first user equipment (UE) and wherein the second wireless device comprises a second UE.

In certain aspects, such as any of operations 600-900 or 1100, the second wireless device receives an indication to transmit the feedback only when the data transmission is not successfully decoded. In certain aspects, the first wireless device transmits the indication in a sidelink control message to the second wireless device.

In certain aspects, such as any of operations 600-900 or 1100, the second wireless device receives an indication to transmit the feedback only when the data transmission is successfully decoded. In certain aspects, the first wireless device transmits the indication in a sidelink control message to the second wireless device.

In certain aspects, such as any of operations 600-900 or 1100, the second wireless device receives an indication to transmit the feedback when the data transmission is successfully decoded and when the data transmission is not successfully decoded. In certain aspects, the first wireless device transmits the indication in a sidelink control message to the second wireless device.

In certain aspects, such as any of operations 600-900 or 1100, the sidelink control channel comprises a physical sidelink control channel, the sidelink data channel comprises a physical sidelink shared channel, and the feedback is communicated over a physical sidelink feedback channel.

In certain aspects, such as any of operations 600-900 or 1100, the second transmission comprises one of second control information, second data, or second feedback.

Figure 12:
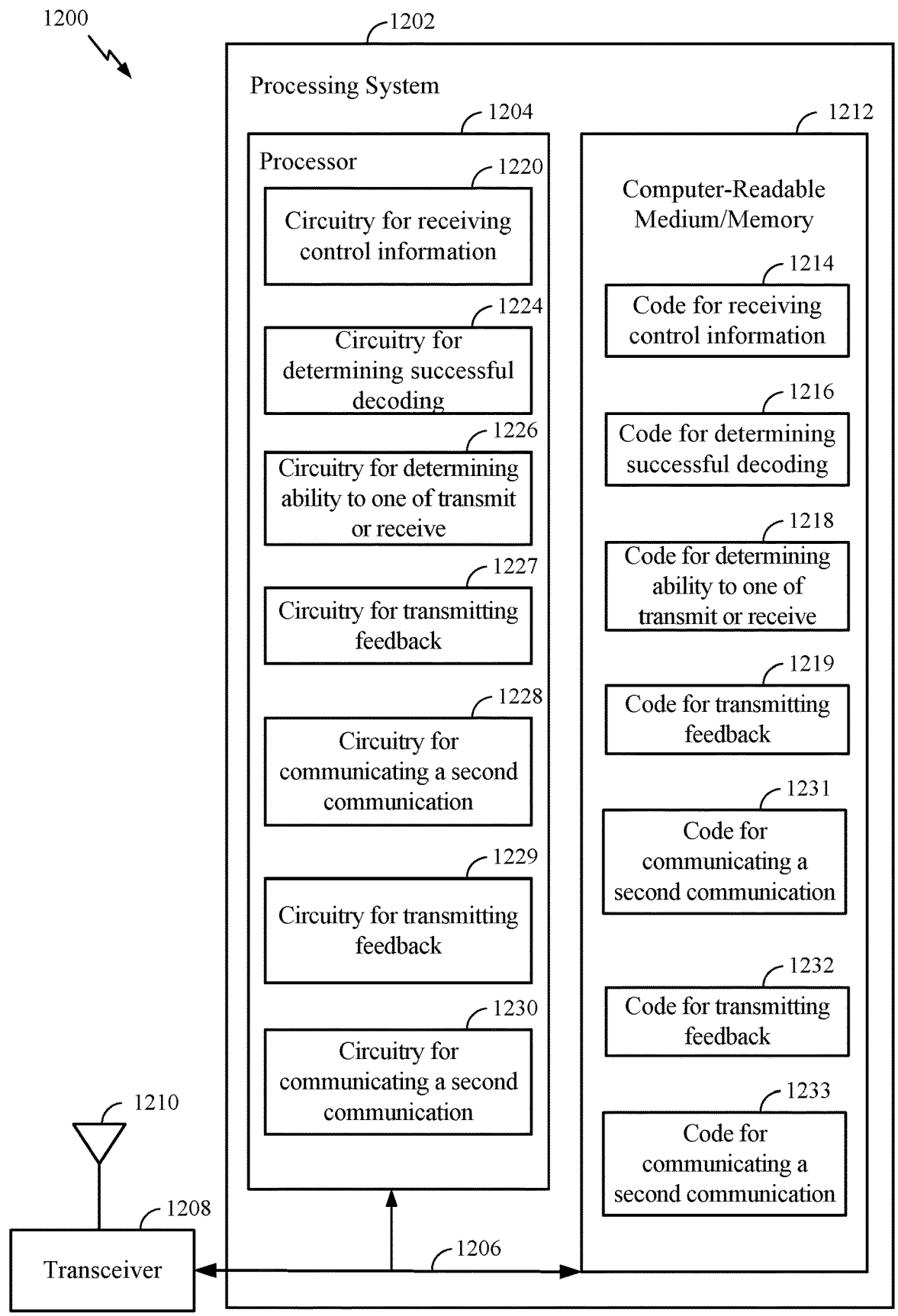
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in one or more of FIG. 3-5 or 10. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/ memory 1212 is configured to store instructions (e.g., computer-executable code) that when executed by the processor 1204, cause the processor 1204 to perform the operations illustrated in one or more of FIG. 3-5 or 10, or other operations for performing the various techniques discussed herein for communicating feedback for data transmissions over a sidelink in a wireless communication system.

In certain aspects, computer-readable medium/memory 1212 stores code for (e.g., an example of means for) receiving control information 1214, code for (e.g., an example of means for) determining successful decoding 1216, code for (e.g., an example of means for) determining ability to one or transmit or receive 1218, code for (e.g., an example of means for) transmitting feedback 1219, code for (e.g., an example of means for) communicating a second communication 1231, code for (e.g., an example of means for) transmitting feedback 1232, and code for (e.g., an example of means for) communicating a second communication 1233. One or more of code 1214-1219 and 1231-1233 may be executed by a general-purpose processor, a digital signal processor (DSP), an application-specific integrated circuit (ASIC), a field programmable gate array (FPGA) or other programmable logic device. In certain aspects, the processor 1204 executes the code stored in the computer-readable medium/memory 1212. In certain aspects, computer-readable medium/memory 1212 is an example of a sidelink feedback manager 281.

In certain aspects, alternatively or additionally, the processor 1204 includes circuitry (e.g., an example of means for) for receiving control information 1220, circuitry (e.g., an example of means for) for determining successful decoding 1224, circuitry (e.g., an example of means for) for determining ability to one or transmit or receive 1226, circuitry (e.g., an example of means for) for transmitting feedback 1227, circuitry (e.g., an example of means for) for communicating a second communication 1228, circuitry (e.g., an example of means for) for transmitting feedback 1229, and circuitry (e.g., an example of means for) for communicating a second communication 1230. One or more of circuitry 1220-1230 may be implemented by one or more of a general-purpose processor, a digital signal processor (DSP), an application-specific integrated circuit (ASIC), a field programmable gate array (FPGA) or other programmable logic device. In certain aspects, processor 1204 is an example of a sidelink feedback manager 281.

The transceiver 1208 may provide a means for receiving information such as packets, user data, or control information associated with various information channels (e.g., control channels, data channels, and information related to power saving of smart repeaters based on a triggering signal, etc.). Information may be passed on to other components of the device 1200. The transceiver 1208 may be an example of aspects of the transceiver 254 described with reference to FIG. 2. The antenna 1210 may correspond to a single antenna or a set of antennas. The transceiver 1208 may provide means for transmitting signals generated by other components of the device 1200.

Figure 13:
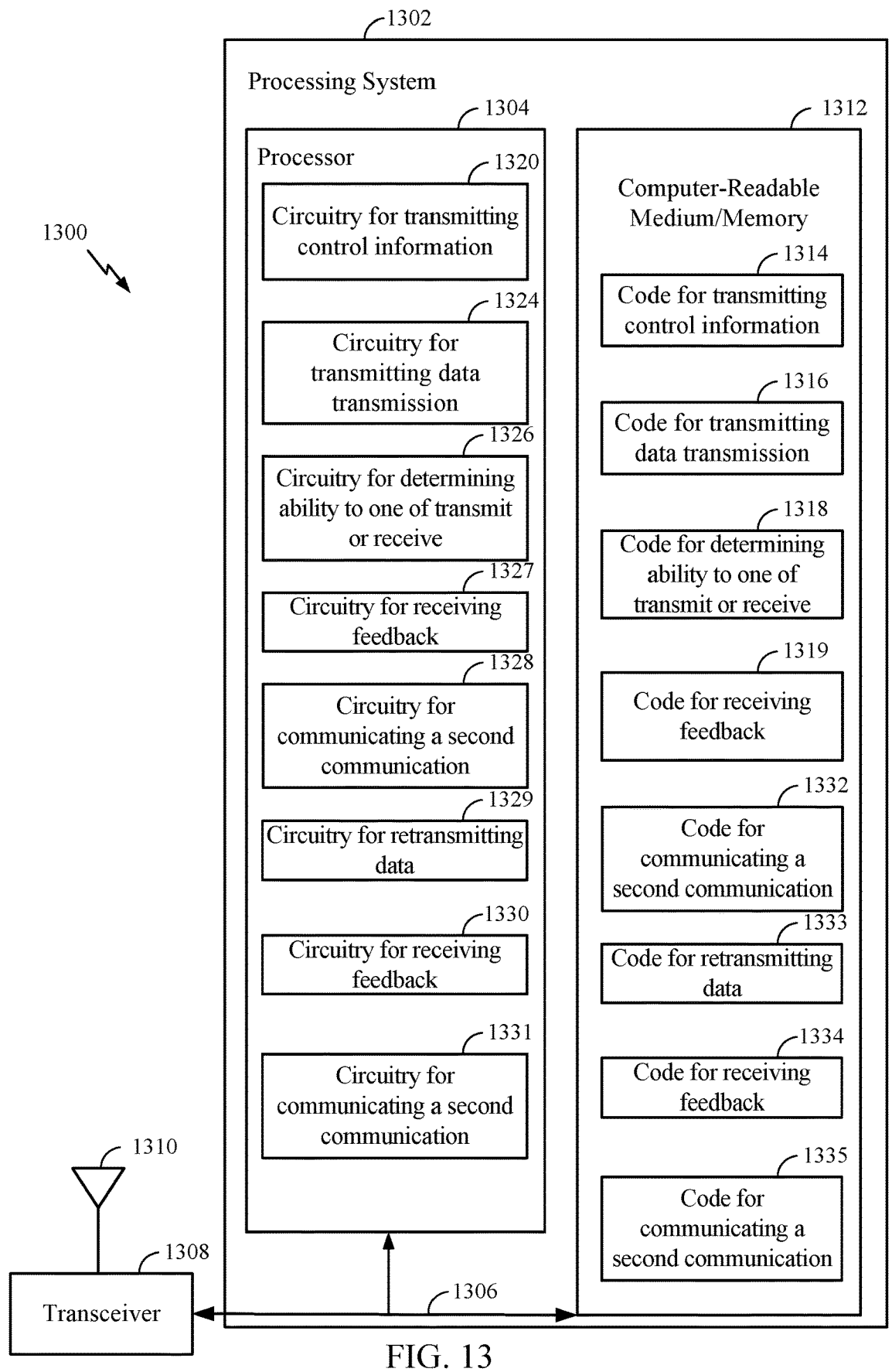
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in one or more of FIG. 6-9 or 11. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/ memory 1312 is configured to store instructions (e.g., computer-executable code) that when executed by the processor 1304, cause the processor 1304 to perform the operations illustrated in one or more of FIG. 6-9 or 11, or other operations for performing the various techniques discussed herein for communicating feedback for data transmissions over a sidelink in a wireless communication system.

In certain aspects, computer-readable medium/memory 1312 stores code for (e.g., an example of means for) transmitting control information 1314, code for (e.g., an example of means for) transmitting data transmission 1316, code for (e.g., an example of means for) determining ability to one or transmit or receive 1318, code for (e.g., an example of means for) receiving feedback 1319, code for (e.g., an example of means for) communicating a second communication 1332, code for (e.g., an example of means for) retransmitting data 1333, code for (e.g., an example of means for) receiving feedback 1334, and code for (e.g., an example of means for) communicating a second communication 1335. One or more of code 1314-1319 and 1332-1335 may be executed by a general-purpose processor, a digital signal processor (DSP), an application-specific integrated circuit (ASIC), a field programmable gate array (FPGA) or other programmable logic device. In certain aspects, the processor 1304 executes the code stored in the computer-readable medium/memory 1312. In certain aspects, computer-readable medium/memory 1312 is an example of a sidelink feedback manager 281.

In certain aspects, alternatively or additionally, the processor 1304 includes circuitry (e.g., an example of means for) for transmitting control information 1320, circuitry (e.g., an example of means for) for transmitting data transmission 1324, circuitry (e.g., an example of means for) for determining ability to one or transmit or receive 1326, circuitry (e.g., an example of means for) for receiving feedback 1327, circuitry (e.g., an example of means for) for communicating a second communication 1328, circuitry (e.g., an example of means for) for retransmitting data 1329, circuitry (e.g., an example of means for) for receiving feedback 1330, and circuitry (e.g., an example of means for) for communicating a second communication 1331. One or more of circuitry 1320-1331 may be implemented by one or more of a general-purpose processor, a digital signal processor (DSP), an application-specific integrated circuit (ASIC), a field programmable gate array (FPGA) or other programmable logic device. In certain aspects, processor 1304 is an example of a sidelink feedback manager 281.

The transceiver 1308 may provide a means for receiving information such as packets, user data, or control information associated with various information channels (e.g., control channels, data channels, and information related to power saving of smart repeaters based on a triggering signal, etc.). Information may be passed on to other components of the device 1300. The transceiver 1308 may be an example of aspects of the transceiver 254 described with reference to FIG. 2. The antenna 1310 may correspond to a single antenna or a set of antennas. The transceiver 1308 may provide means for transmitting signals generated by other components of the device 1300.

The sidelink feedback manager 281 may support wireless communication in accordance with examples as disclosed herein.

The sidelink feedback manager 281 may be an example of means for performing various aspects described herein. The sidelink feedback manager 281, or its sub-components, may be implemented in hardware (e.g., in uplink resource management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the sidelink feedback manager 281, or its sub-components, may be implemented in code (e.g., as uplink resource management software or firmware) executed by a processor, or any combination thereof. If implemented in code executed by a processor, the functions of the sidelink feedback manager 281, or its sub-components may be executed by a general-purpose processor, a digital signal processor (DSP), an application-specific integrated circuit (ASIC), a field programmable gate array (FPGA) or other programmable logic device.

In some examples, the sidelink feedback manager 281 may be configured to perform various operations (e.g., receiving, determining, transmitting) using or otherwise in cooperation with the transceiver 1208/1308.

The sidelink feedback manager 281, or its sub-components, may be physically located at various positions, including being distributed such that portions of functions are implemented at different physical locations by one or more physical components. In some examples, the sidelink feedback manager 281, or its sub-components, may be a separate and distinct component in accordance with various aspects of the present disclosure. In some examples, the sidelink feedback manager 281, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Aspects

Aspect 1: A method of wireless communication by a first wireless device, the method comprising: receiving control information over a sidelink control channel from a second wireless device, the control information comprising information for decoding a data transmission on a sidelink data channel; and when only one of either feedback can be transmitted to the second wireless device or a second communication can be communicated, wherein the feedback is indicative of whether the data transmission is successfully decoded by the first wireless device: transmitting the feedback to the second wireless device when a priority associated with the feedback is higher than a priority associated with the second communication; and communicating the second communication when the priority associated with the second communication is higher than the priority associated with the feedback.

Aspect 2: The method of Aspect 1, wherein communicating the second communication comprises communicating a second feedback over a sidelink channel, wherein the first wireless device comprises a first user equipment and wherein the second wireless device comprises a second user equipment.

Aspect 3: The method of Aspect 2, wherein communicating the second feedback comprises receiving the second feedback over the sidelink channel.

Aspect 4: The method of Aspect 1, wherein communicating the second communication comprises communicating with a base station, wherein the first wireless device comprises a first user equipment, and wherein the second wireless device comprises a second user equipment.

Aspect 5: The method of any of Aspects 1-4, wherein the priority associated with the feedback is higher than the priority associated with the second communication based on the feedback comprising a negative acknowledgment indicating that the data transmission was not successfully decoded.

Aspect 6: The method of any of Aspects 1-4, wherein the priority associated with the second communication is higher than the priority associated with the feedback based on the feedback comprising an acknowledgment indicating that the data transmission was successfully decoded.

Aspect 7: The method of any of Aspects 1-4, further comprising transmitting the feedback to the second wireless device when the priority associated with the feedback is equal to the priority associated with the second communication.

Aspect 8: The method of any of Aspects 1-4, further comprising communicating the second communication when the priority associated with the second communication is equal to the priority associated with the feedback.

Aspect 9: The method of any of Aspects 1-4 or 7-8, wherein the priority associated with the feedback and the priority associated with the second communication are based on respective quality of service indications.

Aspect 10: The method of Aspect 9, wherein the quality of service indications are indicated at a physical layer level or media access control layer level.

Aspect 11: The method of any of Aspects 1-10, wherein the first wireless device is configured to communicate using time division duplexing (TDD).

Aspect 12: The method of any of Aspects 1-11, wherein the first wireless device uses half-duplex communication.

Aspect 13: The method of any of Aspects 1-12, wherein the sidelink control channel comprises a physical sidelink control channel, wherein the sidelink data channel comprises a physical sidelink shared channel, and wherein the feedback is communicated over a physical sidelink feedback channel.

Aspect 14: A method of wireless communication by a first wireless device, the method comprising: transmitting control information over a sidelink control channel to a second wireless device, the control information comprising information for the second wireless device to decode a data transmission on a sidelink data channel; transmitting the data transmission over the sidelink data channel to the second wireless device; and when only one of either feedback can be received from the second wireless device or a second communication can be communicated, wherein the feedback is indicative of whether the data transmission is successfully decoded by the second wireless device: receiving the feedback from the second wireless device when a priority associated with the feedback is higher than a priority associated with the second communication; and communicating the second communication when the priority associated with the second communication is higher than the priority associated with the feedback.

Aspect 15: The method of Aspect 14, wherein communicating the second communication comprises transmitting a second feedback over a sidelink channel, wherein the first wireless device comprises a first user equipment and wherein the second wireless device comprises a second user equipment.

Aspect 16: The method of Aspect 15, further comprising, based on transmitting the second feedback, retransmitting the data transmission to the second wireless device on the sidelink data channel.

Aspect 17: The method of any of Aspects 14-16, further comprising receiving the feedback from the second wireless device when the priority associated with the feedback is equal to the priority associated with the second communication.

Aspect 18: The method of any of Aspects 14-16, further comprising communicating the second communication when the priority associated with the second communication is equal to the priority associated with the feedback.

Aspect 19: The method of any of Aspects 14-18, wherein the priority associated with the feedback and the priority associated with the second communication are based on respective quality of service indications.

Aspect 20: The method of Aspect 19, wherein the quality of service indications are indicated at a physical layer level or media access control layer level.

Aspect 21: The method of any of Aspects 14-20, wherein the first wireless device is configured to communicate using time division duplexing (TDD).

Aspect 22: The method of any of Aspects 14-21, wherein the first wireless device uses half-duplex communication.

Aspect 23: The method of any of Aspects 14-22, wherein the sidelink control channel comprises a physical sidelink control channel, wherein the sidelink data channel comprises a physical sidelink shared channel, and wherein the feedback is communicated over a physical sidelink feedback channel.

Aspect 24: A first wireless device comprising at least one means for performing a method of any one of Aspects 1-23.

Aspect 25: A first wireless device comprising a processor and memory coupled to the processor, the processor and memory configured to perform a method of any one of Aspects 1-23.

Aspect 26: A non-transitory computer-readable storage medium having instructions stored thereon, that when executed by a first wireless device, cause the first wireless device to perform a method of any one of Aspects 1-23.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 3-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a first wireless device, the method comprising:
    receiving control information over a sidelink control channel from a second wireless device, the control information comprising information for decoding a data transmission on a sidelink data channel; and
    when only one of either feedback can be transmitted to the second wireless device or a second communication can be received, wherein the feedback is indicative of whether the data transmission is successfully decoded by the first wireless device:
       transmitting the feedback to the second wireless device when a first priority associated with the feedback is higher than a second priority associated with the second communication, wherein the first priority associated with the feedback is based on the feedback comprising a negative acknowledgment indicating that the data transmission was not successfully decoded; and
       receiving the second communication when the second priority associated with the second communication is higher than the first priority associated with the feedback.

2. The method of claim 1, wherein receiving the second communication comprises receiving a second feedback over a sidelink channel, wherein the first wireless device comprises a first user equipment and wherein the second wireless device comprises a second user equipment.

3. The method of claim 1, wherein receiving the second communication comprises receiving the second communication from a base station, wherein the first wireless device comprises a first user equipment, and wherein the second wireless device comprises a second user equipment.

4. The method of claim 1, wherein the first priority associated with the feedback is higher than the second priority associated with the second communication based on the feedback comprising the negative acknowledgment indicating that the data transmission was not successfully decoded.

5. The method of claim 1, further comprising transmitting the feedback to the second wireless device when the first priority associated with the feedback is equal to the second priority associated with the second communication.

6. The method of claim 1, further comprising communicating the second communication when the second priority associated with the second communication is equal to the first priority associated with the feedback.

7. The method of claim 1, wherein the first priority associated with the feedback and the second priority associated with the second communication are further based on respective quality of service indications.

8. The method of claim 7, wherein the quality of service indications are indicated at a physical layer level or media access control layer level.

9. The method of claim 1, wherein the first wireless device is configured to communicate using time division duplexing (TDD).

10. The method of claim 1, wherein the first wireless device uses half-duplex communication.

11. The method of claim 1, wherein the sidelink control channel comprises a physical sidelink control channel, wherein the sidelink data channel comprises a physical sidelink shared channel, and wherein the feedback is communicated over a physical sidelink feedback channel.

12. A method of wireless communication by a first wireless device, the method comprising:
    transmitting control information over a sidelink control channel to a second wireless device, the control information comprising information for the second wireless device to decode a data transmission on a sidelink data channel;
    transmitting the data transmission over the sidelink data channel to the second wireless device; and
    when only one of either feedback can be received from the second wireless device or a second communication can be communicated, wherein the feedback is indicative of whether the data transmission is successfully decoded by the second wireless device:
       receiving the feedback from the second wireless device when a first priority associated with the feedback is higher than a second priority associated with the second communication;
       communicating the second communication when the second priority associated with the second communication is higher than the first priority associated with the feedback; and
       communicating the second communication when the second priority associated with the second communication is equal to the first priority associated with the feedback.

13. The method of claim 12, wherein communicating the second communication comprises transmitting a second feedback over a sidelink channel, wherein the first wireless device comprises a first user equipment and wherein the second wireless device comprises a second user equipment.

14. The method of claim 13, further comprising, based on transmitting the second feedback, retransmitting the data transmission to the second wireless device on the sidelink data channel.

15. The method of claim 12, wherein the first priority associated with the feedback and the second priority associated with the second communication are further based on respective quality of service indications.

16. The method of claim 15, wherein the quality of service indications are indicated at a physical layer level or media access control layer level.

17. The method of claim 12, wherein the first wireless device is configured to communicate using time division duplexing (TDD).

18. The method of claim 12, wherein the first wireless device uses half-duplex communication.

19. The method of claim 12, wherein the sidelink control channel comprises a physical sidelink control channel, wherein the sidelink data channel comprises a physical sidelink shared channel, and wherein the feedback is communicated over a physical sidelink feedback channel.

20. A first wireless device comprising:
a memory; and
a processor coupled to the memory, the processor being configured to:
receive control information over a sidelink control channel from a second wireless device, the control information comprising information for decoding a data transmission on a sidelink data channel; and
when only one of either feedback can be transmitted to the second wireless device or a second communication can be received, wherein the feedback is indicative of whether the data transmission is successfully decoded by the first wireless device:
transmit the feedback to the second wireless device when a first priority associated with the feedback is higher than a second priority associated with the second communication, wherein the first priority associated with the feedback is based on the feedback comprising a negative acknowledgment indicating that the data transmission was not successfully decoded; and
receive the second communication when the second priority associated with the second communication is higher than the first priority associated with the feedback.

21. The first wireless device of claim 20, wherein to receive the second communication, the processor is configured to receive a second feedback over a sidelink channel, wherein the first wireless device comprises a first user equipment and wherein the second wireless device comprises a second user equipment.

22. The first wireless device of claim 20, wherein to communicate the second communication, the processor is configured to communicate with a base station, wherein the first wireless device comprises a first user equipment, and wherein the second wireless device comprises a second user equipment.

23. A first wireless device comprising:
a memory; and
a processor coupled to the memory, the processor being configured to:
transmit control information over a sidelink control channel to a second wireless device, the control information comprising information for the second wireless device to decode a data transmission on a sidelink data channel;
transmit the data transmission over the sidelink data channel to the second wireless device; and
when only one of either feedback can be received from the second wireless device or a second communication can be communicated, wherein the feedback is indicative of whether the data transmission is successfully decoded by the second wireless device:
receive the feedback from the second wireless device when a first priority associated with the feedback is higher than a second priority associated with the second communication;
communicate the second communication when the second priority associated with the second communication is higher than the first priority associated with the feedback; and
communicate the second communication when the second priority associated with the second communication is equal to the first priority associated with the feedback.

24. The first wireless device of claim 23, wherein to communicate the second communication, the processor is configured to transmit a second feedback over a sidelink channel, wherein the first wireless device comprises a first user equipment and wherein the second wireless device comprises a second user equipment.

25. The first wireless device of claim 24, wherein the processor is further configured to, based on transmitting the second feedback, retransmit the data transmission to the second wireless device on the sidelink data channel.

26. A non-transitory computer-readable medium comprising executable instructions that, when executed by one or more processors of a first wireless device, cause the first wireless device to:
receive control information over a sidelink control channel from a second wireless device, the control information comprising information for decoding a data transmission on a sidelink data channel; and
when only one of either feedback can be transmitted to the second wireless device or a second communication can be received, wherein the feedback is indicative of whether the data transmission is successfully decoded by the first wireless device:
transmit the feedback to the second wireless device when a first priority associated with the feedback is higher than a second priority associated with the second communication, wherein the first priority associated with the feedback is based on the feedback comprising a negative acknowledgment indicating that the data transmission was not successfully decoded; and
receive the second communication when the second priority associated with the second communication is higher than the first priority associated with the feedback.

27. The non-transitory computer-readable medium of claim 26, wherein the first priority associated with the feedback is higher than the second priority associated with the second communication based on the feedback comprising the negative acknowledgment indicating that the data transmission was not successfully decoded.

28. A non-transitory computer-readable medium comprising executable instructions that, when executed by one or more processors of a first wireless device, cause the first wireless device to:
transmit control information over a sidelink control channel to a second wireless device, the control information comprising information for the second wireless device to decode a data transmission on a sidelink data channel;

transmit the data transmission over the sidelink data channel to the second wireless device; and when only one of either feedback can be received from the second wireless device or a second communication can be communicated, wherein the feedback is indicative of whether the data transmission is successfully decoded by the second wireless device:

receive the feedback from the second wireless device when a first priority associated with the feedback is higher than a second priority associated with the second communication; and communicate the second communication when the second priority associated with the second communication is higher than the first priority associated with the feedback; and communicate the second communication when the second priority associated with the second communication is equal to the first priority associated with the feedback.

\* \* \* \* \*